United States Patent [19]
Catlin

[11] Patent Number: 5,660,428
[45] Date of Patent: Aug. 26, 1997

[54] RECYCLABLE, LOW-COST, COLLISION-RESISTANT AUTOMOBILE CHASSIS AND BODY

[75] Inventor: Christopher Scott Catlin, Beverly Hills, Calif.

[73] Assignee: XCorp, Inc., Malibu, Calif.

[21] Appl. No.: 371,228

[22] Filed: Jan. 11, 1995

[51] Int. Cl.$^6$ .................................................. B60R 27/00
[52] U.S. Cl. .......................... 296/205; 296/189; 296/203; 29/428; 264/311
[58] Field of Search ...................... 296/205, 204, 296/203, 187, 189; 29/428; 297/452.18, DIG. 1, 452.57; 264/311

[56] References Cited

U.S. PATENT DOCUMENTS

| | | | |
|---|---|---|---|
| 3,744,835 | 7/1973 | Carbone et al. | 296/194 X |
| 4,029,350 | 6/1977 | Goupy et al. | 293/110 |
| 4,411,462 | 10/1983 | Buehrig et al. | 296/189 X |
| 4,533,172 | 8/1985 | Oliver | 296/189 X |
| 4,898,419 | 2/1990 | Kenmochi et al. | 296/204 |
| 4,950,026 | 8/1990 | Emmons | 296/203 |
| 5,306,066 | 4/1994 | Saathoff | 296/189 X |

*Primary Examiner*—Joseph D. Pape
*Attorney, Agent, or Firm*—Ladas & Parry

[57] ABSTRACT

An automobile chassis and a one-piece body integrated into a unitary structure, and a method for fabricating, assembling and integrating the chassis and body. The body includes interior panels, a cockpit, an engine enclosure module, and an underbody. The chassis/body structure, comprised of a single type of aluminum alloy and a single type of thermoplastic, is resistant to high-stress loads and is substantially recyclable into industrial-quality constituents. A first preferred embodiment includes a body rotomolded from a reinforced polycarbonate, polycarbonate/ABS blend, or polyimide thermoplastic, seven aluminum alloy bulkheads, and stacks of thin-wall aluminum honeycomb-cell panels embedded in an unreinforced foam of the thermoplastic. A second preferred embodiment includes a body rotomolded from a reinforced liquid crystal polymer thermoplastic, seven aluminum alloy bulkheads, and stacks of thin-wall aluminum honeycomb panels. A third preferred embodiment includes a body rotomolded from a reinforced polycarbonate thermoplastic, seven aluminum alloy bulkheads, and aggregated sub-assemblies of polycarbonate micro-honeycomb blocks having cells filled with a foam of the unreinforced polycarbonate thermoplastic.

37 Claims, 21 Drawing Sheets

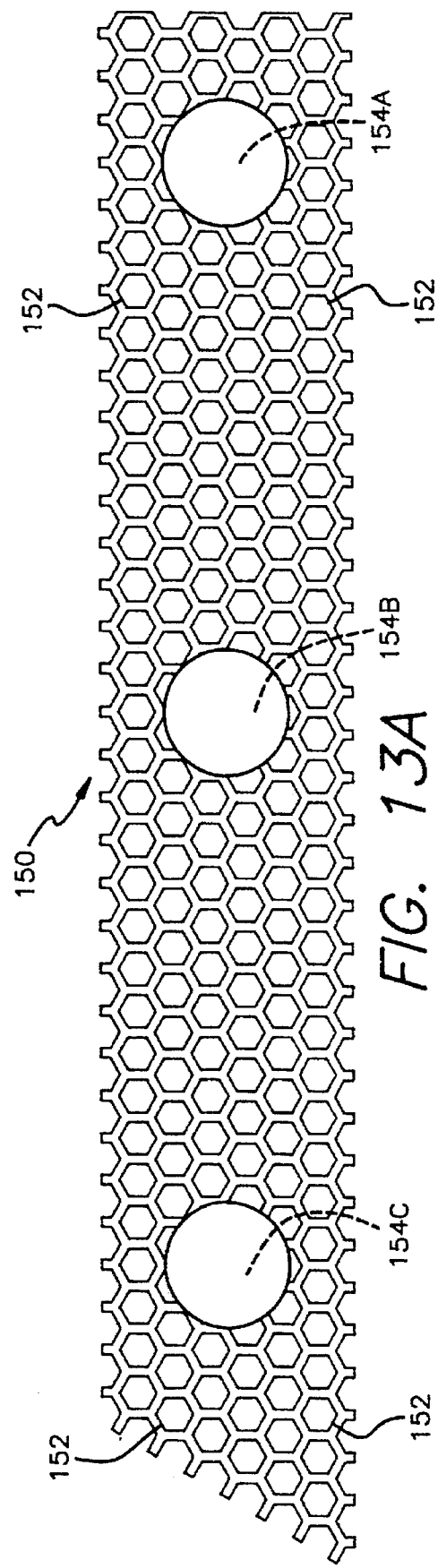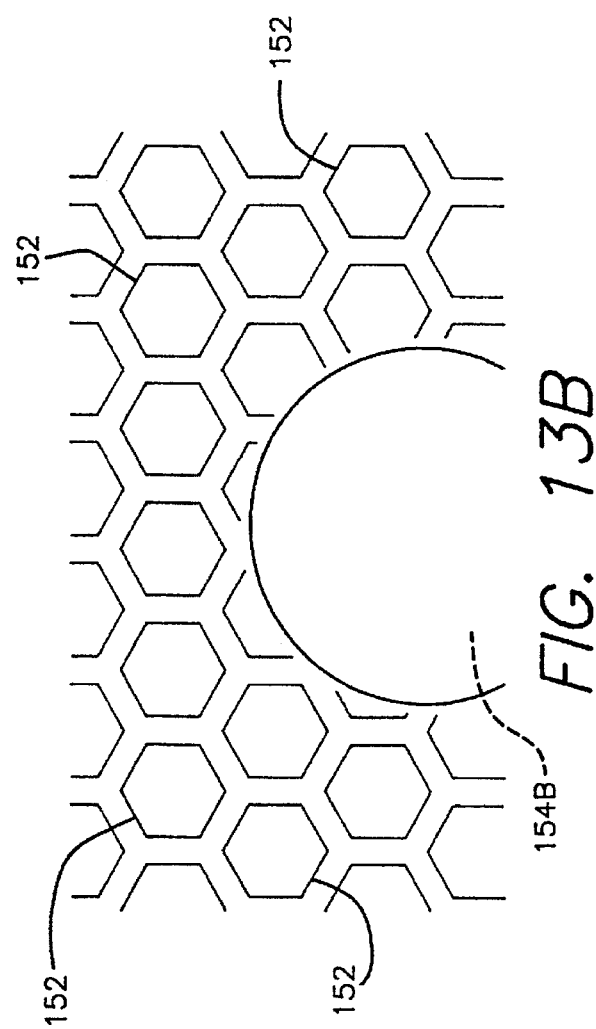

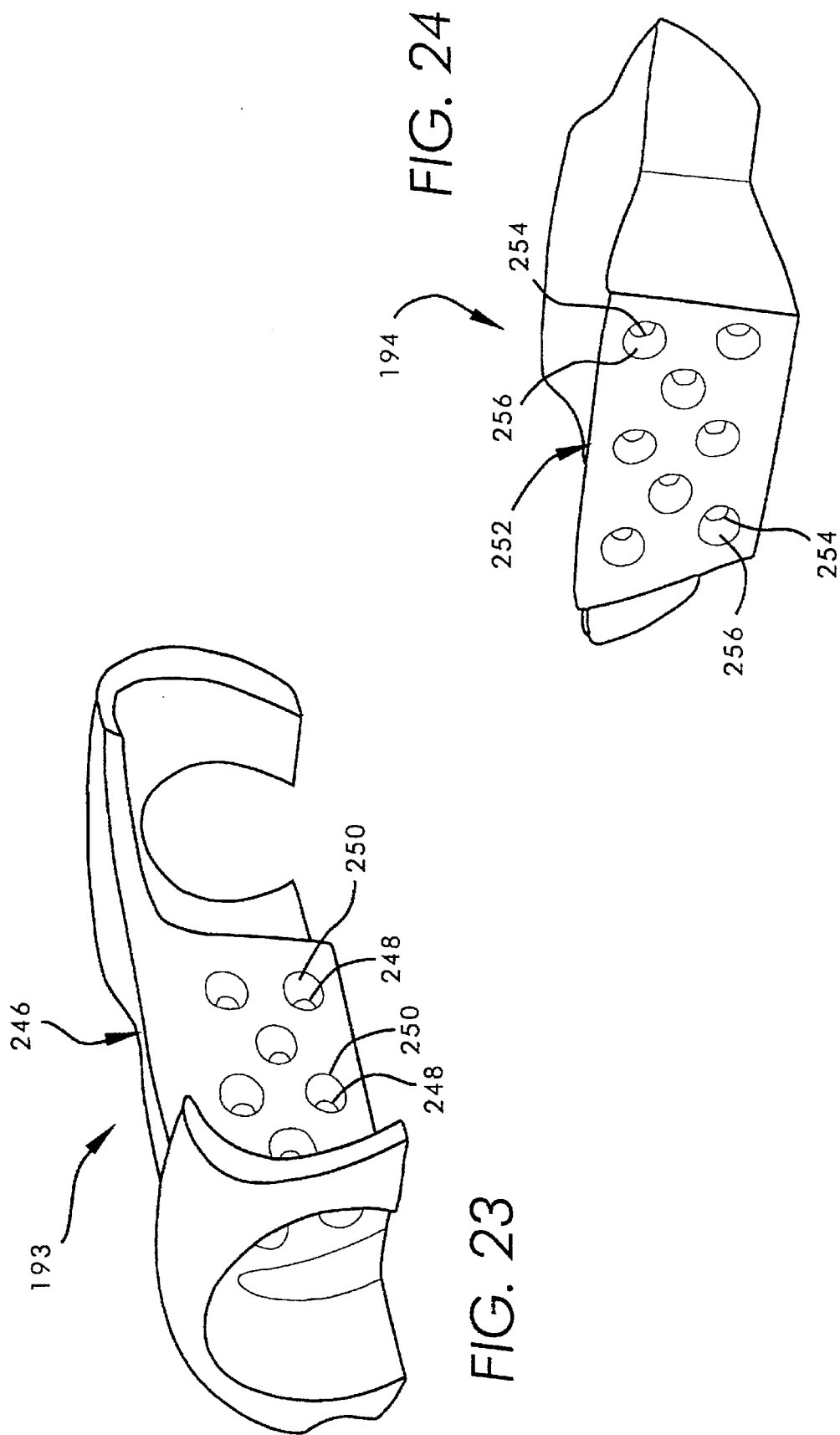

RECYCLABLE, LOW-COST, COLLISION-RESISTANT AUTOMOBILE CHASSIS AND BODY

BACKGROUND OF THE INVENTION

1. Field of the Invention

The present invention relates to the field of automotive design, manufacture and assembly, and more particularly to an automobile chassis and body which are highly resistant to head-on, broadside and rear-end collisions, have low fixed and recurring production costs, are manufactured using processes minimizing waste products and eliminating toxic vapor emissions, and are almost totally comprised of recyclable materials. Specifically, a chassis comprised substantially of aluminum alloy and thermoplastic and a body and interior panels consisting entirely of thermoplastic provide stronger, lighter and cheaper alternatives to reinforced steel frames and sheet-metal body panels currently utilized universally by automobile manufacturers.

In order to build cars comprised of thousands of parts, current automotive construction systems require massive investment in plant and equipment, are energy and labor intensive, are major contributors to pollution, and produce end-product vehicles that often vary substantially in quality. In marked contrast, constructing an automobile in accordance with the principles of the invention enables substantial reduction of the types of materials and numbers of parts needed and makes parts much easier to assemble and disassemble, thus minimizing the labor and energy required, while enabling superior quality control during production, and ensuring that materials eventually recycled can be efficiently restored to high manufacturing quality.

2. Description of the Related Art

Many global, regional and national problems result directly from how automobiles currently are designed, manufactured, operated over their useful life, and eventually discarded. These problems include significant depletion of natural and industrial resources, widespread pollution of air, land, and water by the enormous industrial infrastructure required for fabricating and assembling parts and for disposing of manufacturing waste and automobile scrap, poisoning of the atmosphere by engine exhaust emissions and by toxic vapors released during conventional manufacturing processes, and the large numbers of people killed or injured in automobile collisions.

Responding to changes in consumer preferences, governmental legislation and the pressures of global competition, automobiles have become smaller, lighter and more energy efficient. In 1977, 51 percent of all automobiles on U.S. roads were large; by 1990, large autos totaled 39 percent. In 1972, average curb weight was 4500 lbs.; by 1990, average weight had decreased to 3200 lbs. In 1973, many U.S. made cars had 400-plus horsepower engines providing only 6–8 mpg; by 1993, average mileage was 28 mpg. Presently, one-third of the automobiles sold in the U.S. are compact- or subcompact-sized.

Despite these trends, automobiles have become increasingly expensive, leading people to keep aging cars longer. In 1971, the percentage of automobiles scrapped compared to those in service was 9 percent; by 1991, they were 6.5 percent. In 1980, 12 percent of passenger cars in the U.S. were at least 12 years old. In 1990, the percentage had nearly doubled to 21 percent.

Exhaust emissions from the increasing numbers of older automobiles kept operational have frustrated efforts to reduce air pollution by improving engines and installing catalytic converters. Particularly in California, where benign weather and salt-free roads greatly extend the life of cars, there is an abundance of pre-emission control vehicles that spew out exhaust emissions at rates up to 100 times greater than that of new cars.

Large-scale conversion to zero-emission vehicles, particularly battery powered electric cars, has been proposed as a panacea for reducing air pollution. However, such cars are expected to have sticker prices $5,000 to $10,000 higher than those of conventional cars of similar size having superior performance. Moreover, there necessarily will be significant increases in power plant emissions resulting from charging large numbers of electric vehicles. Thus, in areas where power plants are fueled by coal and oil, the energy demands of electric cars may on balance worsen air quality.

Despite innovations in automobile design contributing to occupant safety such as seatbelts, crumple zones and air bags, and despite the U.S. being the second safest driving country, tens of thousands of people have been killed in traffic accidents over the last three decades and millions more have been injured. Many of these fatalities and injuries result from inability of conventionally designed and built chassis and bodies to withstand high-load impacts and resultant stresses.

Today, a typical mid-size car built in the U.S. consumes about 1200 lbs. of low-carbon steel, 230 lbs. of high-strength steel, 80 lbs. of stainless and other steels, 400 lbs. of iron, 160 lbs. of aluminum, 130 lbs. of rubber, 220 lbs. of plastic, 80 lbs. of glass, 50 lbs. of copper, 20 lbs. of zinc, 25 lbs. of powder metal, and 170 lbs. of fluids and lubricants. In total, the U.S. automotive industry uses over 23 million tons of materials annually, including about two-thirds of the iron, one-fifth of the steel, half of the rubber, and one-fifth of the aluminum produced domestically.

At the end of its operational life, an automobile typically is composed of relatively low value materials, primarily low-carbon steel, iron, aluminum and low grade plastics. More than 9 million automobiles are scrapped each year. Of these, over 90 percent are recycled through an established infrastructure which includes about 12,000 dismantlers and 200 shredding facilities producing 50,000 metric tons of residue annually. Approximately 75–80 percent of the weight of an average automobile is recycled, including most of the steel, iron and aluminum. Battery plates, housings and sulfuric acid are reprocessed; oil, coolants, and refrigerants are reclaimed. Waste textiles are shredded to produce sound insulation, while thermoplastic remnants from production lines, mixed with reclaimed scrap material, are melted down and used to form trunk linings, spare tire covers and ventilation ducts. The average car's plastic content has more than doubled since 1972. Plastic bumper covers, interior panels, trim moldings, bumper beams, fuel tanks, valve covers and oil pans are all in common use today. Although steel and aluminum require much greater amounts of energy to recycle than do plastics, more than one million tons of plastic components from scrapped automobiles end up in landfills each year because it presently is not cost-effective to recover and recycle plastic.

The issue in automobile recycling is not intrinsic feasibility but cost-effectiveness which depends on how easily separable parts are, how many and what types of materials must be separated, and the value of recycled materials. Due to the current trend of increasing complexity in automotive design, it is likely that cars will become more expensive to recycle than they are now because their disassembly and reprocessing will become increasingly complex.

In recent years, composite materials including high performance thermoplastics have been successfully applied to racing car chassis, replacing riveted steel and aluminum sheets. Engineering advantages of composites include increased torsional and bending stiffness, improved crashworthiness, ease of repair and reuse, and structural stability over time. Studies by the Ford Material Research Laboratory have shown that composites can absorb nearly twice the energy-per-unit weight than can steel. Also, stable molds enable reproducible dimensional accuracies during chassis production runs. Tooling cost comparisons show molding equipment to be significantly cheaper than steel presses needed to fabricate sheet-metal panels.

High performance thermoplastics can readily be fabricated into molded products, and can be conveniently melted down for reuse provided that different types are not mixed. They offer high strength-to-weight capabilities, rigidity and toughness, superior thermal and hydrolytic stability, excellent flammability resistance coupled with low smoke generation, and low permeability to moisture and organic solvents. Thermoplastics are particularly well suited to the automotive industry as they can withstand attack by acids, bases, hydrocarbons, gasoline, gasohol, oxidizing solutions, and many other chemicals and solvents.

Among high performance thermoplastics, polycarbonates and liquid crystal polymers (LCP) exhibit some of the highest tensile and flexural performance. In their toughest forms, these thermoplastics are highly wear resistant, and have superior tensile strength and superior flexural modulus.

Lightweight thermoplastic foam sandwich panels have not heretofore been used in the automotive industry. They have, however, been successfully used to construct transportable airfield surfaces which support rapid deployment fighter aircraft. Such surfaces can withstand well over a hundred take-offs and landings.

Sandwich structures including composite materials have been used in constructing light-weight, high efficiency helicopters. Compared to conventional helicopters, payload at equal power is increased due to a lighter structure. Such structures are more expensive than conventional structures containing low cost materials, but enable using automated manufacturing procedures which provide a net economic gain of approximately 30–50 percent. Use of composite sandwiches also enables greater reliability and ease of maintenance, substantially reducing mean time to failure and risk of malfunction.

Fiber-reinforced thermoplastics have been used in thermoplastic/aluminum sandwiches, together with aluminum foam, to construct helicopter chassis and fighter aircraft wing sections. Such thermoplastics have also been used in missile nose cones and artillery shell casings.

Injection molding in-situ where light-weight steel structures are used as frame members is known in the plastics rotomolding art. Also, use of honeycomb prefabricated in flat sections is known in the structural fabrication arts. However, use within a larger structure of thin-wall three-dimensional aluminum honeycomb substructures which serve as molds for injecting unreinforced or reinforced thermoplastic foam has been heretofore unknown in the thermoplastic molding and composite structural fabrication arts.

The racing car industry has made use of monocoque body design, a light, rigid type of construction in which the body is integral to the chassis and the outer skin serves as the frame in that it carries most or all of the stresses. Aluminum and steel are the most common materials used for monocoque chassis.

An all-plastic monocoque tub chassis, developed by Chaparral Cars in 1964, was substantially lighter and stiffer than the steel-tube racing frames then in use. The chassis tubs weighed 120 to 140 lbs. and had 3,000 to 3,500 lb-ft/deg torsional stiffness. The design included two long torque boxes, or pontoons, disposed on opposite sides of a cockpit and engine bay, the forward halves of the pontoons serving as fuel tanks. The pontoons were connected at the front by a box-shaped footwell, by a shallow third fuel tank extending the width of the cockpit and disposed under the driver's knees, and by an integral seatback structure. All of these components were fabricated from plastics incorporating glass fiber, including glass fiber honeycomb. None was directly subject to point loads.

A conventional automobile chassis frame constructed of steel or aluminum members typically requires angled crosspieces between orthogonal members to withstand point-load stresses imposed on the frame. However, use within a chassis frame of honeycomb substructures incorporating unreinforced or reinforced thermoplastic foam which serve to withstand compressive stresses imposed by point-loads on the frame by diverting and diffusing such loads throughout the chassis interior is heretofore unknown in the automotive design arts.

It is unlikely that the enormous resource conservation, environmental, industrial, economic and safety problems created and perpetuated by the automotive industry can be significantly ameliorated by token or piecemeal improvements in how cars are designed, built and scrapped. Dealing effectively with these national, and indeed global, problems will require a radically new and integrated approach to how motor vehicles are designed, manufactured, assembled, operated and reclaimed.

OBJECTS OF THE INVENTION

Accordingly, it is a primary object of the present invention to provide a unitary automobile chassis/body which can be assembled using fewer parts, fewer operations and less materials than are required to assemble a chassis and body of comparable motor vehicles of conventional design.

Another object of the invention is to provide a unitary automobile chassis/body whose construction requires less capital equipment, tooling, labor and floor space than are required to construct a chassis and body of comparable motor vehicles of conventional design.

A further object of the invention is to provide a unitary automobile chassis/body enabling production of motor vehicles which are more energy efficient and lower in cost than vehicles of conventional design.

Yet another object of the invention is to provide a unitary chassis/body that is relatively simple and inexpensive to manufacture and enables maintaining high quality control during manufacturing.

A further object of the invention is to provide a method of attaching exterior modular body panels and other modular external parts to a unitary automobile chassis/body at low labor cost and with high quality control.

A still further object of the invention is to provide an automobile chassis which provides high resistance to impact-type high-stress loads such as result from head-on, rear-end and broadside collisions, by diverting and diffusing such loads throughout the chassis structure.

Another object of the invention is to provide an automobile chassis which provides a highly crash-worthy roll-cage surrounding a vehicle's occupants.

Yet another object of the invention is to provide an automobile chassis which can be substantially and cost-effectively recycled into relatively high value constituents of sufficient purity to enable industrial reuse.

A further object of the invention is to provide an automobile body including interior panels, a cockpit, an engine enclosure module and an underbody, which can be entirely fabricated within a single mold.

Another object of the invention is to provide an automobile body which can be substantially and cost-effectively recycled into relatively high value constituents of sufficient purity to enable industrial reuse.

Yet another object of the invention is to provide an automobile body which can be integrated with a chassis, at low labor cost and within a single mold, into a unitary structure having high strength and light weight.

Other objects of the invention will become evident when the following description is considered with the accompanying drawings.

SUMMARY OF THE INVENTION

The above and other objects are met by the present invention, an automobile chassis and a one-piece body integrated into a unitary structure, and a method for fabricating, assembling and integrating the chassis and body. The invention overcomes inadequacies of conventional automotive chassis and body construction techniques by enabling reduced investment and production costs due to fewer parts, fewer operations, less materials, and reduced capital equipment, tooling, labor and floor space required to build chassis and bodies, as well as entire automobiles. A chassis/body of the invention accommodates attachment of standard modular parts such as exterior body panels. Moreover, the chassis and the combined chassis/body are highly resistant to high-stress loads such as result from collisions and crashes. The chassis comprising a single type of aluminum alloy and a single type of thermoplastic, and the body consisting of the same thermoplastic and including a plurality of interior panels, a cockpit, an engine enclosure module and an underbody, are substantially recyclable into high-quality constituents using conventional reclamation processes.

A chassis common to first, second and third embodiments comprises seven generally planar and parallel bulkheads. A first (front), second and seventh (rear) bulkhead are identical single-piece aluminum alloy solid castings in the shape of an inverted trapezoid section including a trapezoidal central portion symmetrically disposed between two opposed outer portions, the three portions including a plurality of circular and oval holes cast-in therethrough. Opposed first and second shock tower assembly portions are generally orthogonal to, respectively, the top edge of the outer portions. A third bulkhead includes a "W"-shaped section including a generally vertical middle portion disposed symmetrically between two generally vertical outer portions, the middle and outer portions connected by a generally horizontal base portion, and a generally horizontal cross-piece section, the W-shaped section including a plurality of circular and oval holes cast-in therethrough. The two sections are cast from the same aluminum alloy as are the first, second and seventh bulkheads, and are rigidly joined by adhesives and a plurality of pop-rivets. A fourth bulkhead includes a planar central section identical to the middle and base portions of the third bulkhead, and opposed first and second three-segmented frame support members each including a base segment, a brace segment angled with respect to the central section toward the fifth bulkhead, and a bracket segment generally orthogonal to the central section. A fifth bulkhead includes a W-shaped section and a cross-piece section identical to those of the third bulkhead, and first and second "X"-shaped ribbing sections connecting, respectively, the middle vertical portion of the W-shaped section and the two outer vertical portions. A sixth bulkhead includes a "U"-shaped section and a generally horizontal cross-piece section, the U-shaped section including a plurality of circular and oval holes cast-in therethrough. The two sections are cast from the same aluminum alloy as are the other bulkheads, and are rigidly joined by adhesives and a plurality of pop-rivets. Opposed first and second shock tower assembly portions are orthogonal to, respectively, the corners of the cross-piece section.

Three generally circular (upper, middle, lower) holes are disposed generally collinearly in each of the two outer portions of the first, second, third, fifth, sixth and seventh bulkheads, so that when the chassis is assembled, corresponding hole centers are aligned, respectively, along six generally parallel, horizontal axes. The central portion of the first, second and seventh bulkheads, and the middle portion of the W-shaped section of the third, fourth and fifth bulkheads each include therethrough, first (lower) and second (upper) generally circular holes whose centers align, respectively, along first and second generally parallel and horizontal axes, the two axes lying in a generally vertical plane. First and second generally circular aluminum alloy "backbone" tubes are disposed through, respectively, the lower and upper holes in the six bulkheads, along the chassis length. The backbone tubes are used, respectively, to house a fuel bladder, and electrical wiring and hydraulic line harnesses.

The first, second and third bulkheads are rigidly connected in each outer portion by upper and middle relatively short, arcuate sections of aluminum alloy "thinwall" tubing closely received within the upper and middle holes in the bulkhead outer portions. Similarly, the fifth, sixth and seventh bulkheads are rigidly connected in each outer portion by upper and middle relatively short, arcuate sections of thinwall tubing closely received within the upper and middle holes in the bulkhead outer portions. The first, second, third, fourth, fifth, sixth and seventh bulkheads are rigidly connected in each outer portion by a lower relatively long, arcuate section of thinwall tubing closely received within the lower hole in each bulkhead outer portion. The third, fourth and fifth bulkheads are rigidly connected by two pairs of relatively short, straight sections of thinwall tubing which are closely received within respective aligned holes in the base portion of each W-shaped section, the four holes in each base portion being generally collinear, and the two tubes of each pair symmetrically disposed with respect to the lower backbone tube. The first, second, third, fourth, fifth, sixth and seventh bulkheads are rigidly connected by two relatively long, arcuate sections of thinwall tubing which are closely received within holes in each bulkhead generally collinear with the base portion holes, each tubing section disposed between a pair of the short, straight tubes. The sections of thinwall tubing and the upper and lower backbone tubes are attached to the bulkheads using a heat-activated, slow-jelling, thermoplastic-based adhesive applied at each tube-bulkhead hole junction.

Prior to inserting the sections of thinwall tubing and backbone tubes through the bulkhead holes, a stack of generally rectangular-shaped panels is interposed between the two outer portions of adjacent bulkheads one and two, two and three, five and six, and six and seven. Each panel includes a multiplicity of contiguous, rigidly attached hexagonal rods, closed at both ends, each rod originally solid but hollowed out to form a thin-wall hexagonal cross-section cell having an interior diametric dimension of about one-inch, so that cells are disposed in a honeycomb pattern. Each panel further includes therethrough three generally circular holes disposed so that when a stack of panels is interposed, corresponding holes in each panel are congruent and can closely receive, respectively, the three sections of thinwall tubing between each pair of bulkhead outer portions. The number of panels in a stack is selected so that the stack thickness is slightly less than the spacing between the two bulkheads. In like manner, generally vertical stacks of trapezoidal-shaped panels having holes congruent to the lower and upper backbone holes in the first, second, third, fourth and fifth bulkheads are interposed between bulkheads one and two, two and three, three and four, and four and five, and two opposed generally horizontal stacks of rectangular-shaped panels having holes congruent to the two doublets of collinear base holes are interposed between bulkheads three and four, four and five, and five and six.

Thus, vertically disposed first, second and third stacks are interposed between the first and second bulkheads, and vertically disposed fourth, fifth and sixth stacks are interposed between the second and third bulkheads. A vertically disposed seventh stack and horizontally disposed eighth and ninth stacks are interposed between the third and fourth bulkheads. Vertically disposed tenth, eleventh and twelfth and horizontally disposed thirteenth and fourteenth stacks are interposed between the fourth and fifth bulkheads. Vertically disposed fifteenth and sixteenth and horizontally disposed seventeenth and eighteenth stacks are interposed between the fifth and sixth bulkheads. Vertically disposed nineteenth and twentieth and horizontally disposed twenty-first and twenty-second stacks are interposed between the sixth and seventh bulkheads.

In a first preferred embodiment, a pre-assembled chassis is accurately positioned within a first (lower) portion of a "clamshell"-type steel mold adapted for rotational molding (rotomolding) of thermoplastic. A second (upper) portion of the mold is configured to fabricate as a unitary piece an automobile body including a plurality of interior panels, a cockpit, an engine enclosure module, and an underbody. When the mold is closed, the two portions juxtapose at a planar interface which is rigidly clamped during the rotomolding process. A sealant is placed around the interface perimeter to prevent leakage of molten thermoplastic. A predetermined quantity of a single type of polycarbonate thermoplastic in the form of pellets reinforced with recyclable high-strength glass microspheres ("microballoons"), and sufficient to fill all cavities between the mold and chassis up to about ¾-inch from the chassis outer surfaces is introduced into the mold which is then loaded into an oven and heated to a predetermined interior temperature sufficient to melt the pellets. During heating, the mold is rotated continuously about vertical and horizontal axes so that all surfaces within the mold are coated with thermoplastic, the biaxial rotation being at an angular speed sufficient to create a centrifugal force which impels the molten thermoplastic from the mold interior, and particularly away from interstices between contiguous hexagonal rods in the honeycomb panels toward mold surfaces external to the chassis. Thus, molten thermoplastic completely fills most of the cavities between the chassis and interior mold surfaces. The mold is then cooled to a predetermined temperature to harden the polycarbonate thermoplastic now formed as a one-piece automobile body including pluralities of interior and exterior surfaces. The mold interior is then reheated to a predetermined temperature below the softening point of the thermoplastic but sufficiently high to maintain fluid flow of polycarbonate thermoplastic foam. A predetermined quantity of foam created from an unreinforced grade of the same polycarbonate thermoplastic is injected into the mold which is then rotated biaxially until the aluminum chassis is completely immersed in the foam and the foam has filled the interstices in the honeycomb panels and bonded with the corrugated interior and exterior body surfaces. The mold is then cooled to room temperature and the integrated chassis/body removed.

Alternatively, the thermoplastic used may be a mixture comprising polycarbonate and acrylonitrile butadiene styrene (ABS), or a high strength polyimide resin.

The first embodiment further includes two identical two-piece "bucket"-type seats, each comprising an aluminum honeycomb structure impregnated with a polycarbonate thermoplastic foam and arcuately shaped to conform to the human torso, a plurality of locking hinges, and a base integral to the chassis.

The first embodiment also includes a front and a rear energy absorption structure fabricated in a clamshell-type mold similar to that used for the chassis/body. Each structure includes a plurality of crushable low-density cones fabricated from a polycarbonate thermoplastic foam.

A second preferred embodiment is directed to an ultra-high strength chassis/body such as may be desirable for small city buses, light-rail cars, or off-road vehicles intended to traverse rugged terrain. Aluminum chassis bulkheads, thinwall tubing and honeycomb panels are the same as in the first embodiment; and the one-piece thermoplastic body produced by rotomolding has the same dimensions and contours as in the first embodiment. However, after a pre-assembled chassis is positioned within a clamshell mold and the mold clamped and sealed, the mold interior is preheated to the melting point of a liquid crystal polymer thermoplastic and a first quantity of glass microfiber-reinforced LCP thermoplastic is introduced into the mold interior as the mold is rotated biaxially at an angular speed sufficient to centrifugally impel liquefied LCP toward the mold interior surfaces. Maintaining the mold interior at the LCP melting temperature, a second quantity of the same reinforced LCP thermoplastic is introduced directly into the chassis interior as the mold is rotated biaxially at an angular rate sufficient to isotropically distribute liquefied LCP within interstices between contiguous rods of the honeycomb panels. Thus, no thermoplastic foam is used in the integrated chassis/body of the second embodiment.

The second embodiment further includes the two bucket-type seats and front and rear energy absorption structures of the first embodiment. Thus, while microfiber-reinforced LCP thermoplastic is used exclusively in the integrated chassis/body, polycarbonate thermoplastic foam is used in the seats and energy absorption structures.

A third preferred embodiment includes the same aluminum chassis bulkheads and thinwall tubing as in the first and second embodiments. The one-piece rotomolded thermoplastic body has the same dimensions and contours as in the first and second embodiments. However, multiplicities of relatively thick polycarbonate "micro-honeycomb" (MHC) blocks, each including a multiplicity of hexagonal cells ("hex-cells"), are used instead of stacks of relatively thin honeycomb panels. Alternatively, multi-block "subassembly" structures of various shapes conforming to chassis interior contours can be assembled by gluing together appropriate numbers and shapes of blocks. Hex-cells have an outer diametric dimension of about ½-inch and a 1/16-inch wall thickness. Using injection molding, individual MHC blocks or multi-block structures are covered with a low density polycarbonate thermoplastic foam before being attached to and inserted within the chassis frame.

After a pre-assembled chassis including a plurality of sub-assemblies of foamed MHC blocks rigidly attached to the bulkheads and tubing is positioned within a clamshell mold, the mold is clamped and sealed. Pellets of an unreinforced grade of the same polycarbonate thermoplastic used for foaming the MHC are introduced into the mold after the interior is heated to the polycarbonate melting point. The mold is then rotated biaxially at an angular speed sufficient to centrifugally impel liquefied polycarbonate toward the mold interior surfaces and fill cavities between the MHC block sub-assemblies and chassis bulkheads and tubing.

Compared to the first and second embodiments, the third embodiment provides simpler chassis assembly, and also simplifies rotomolding to a one-step process.

The third embodiment further includes the two buckettype seats and front and rear energy absorption structures of the first and second embodiments.

A more complete understanding of the present invention and other objects, aspects and advantages thereof will be gained from a consideration of the following description of the preferred embodiments read in conjunction with the accompanying drawings provided herein.

BRIEF DESCRIPTION OF THE DRAWINGS

FIG. 13A is both a partial front elevational view and a transverse cross-sectional view of an exemplary aluminum honeycomb panel in accordance with first and second embodiments of the invention.

FIG. 13B is a detail view of a small portion of the FIG. 13A panel.

FIG. 23 is a perspective view of the FIG. 22 forward energy absorption structure including a plurality of compression cones.

FIG. 24 is a perspective view of the FIG. 22 rear energy absorption structure including a plurality of compression cones.

DESCRIPTION OF THE PREFERRED EMBODIMENTS

I. FIRST PREFERRED EMBODIMENT

A. COMPLETE CHASSIS ASSEMBLY

Figure 1:
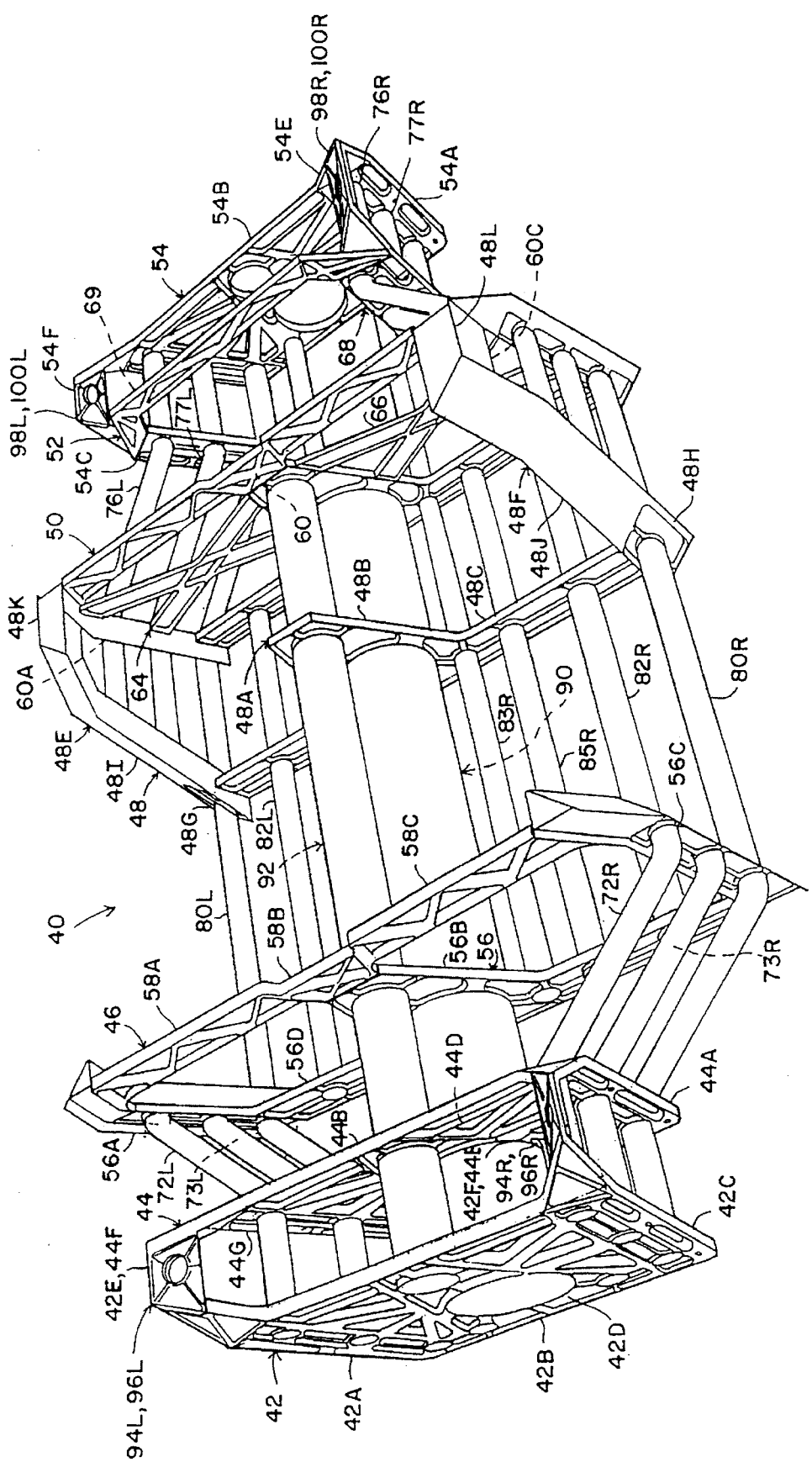
FIG. 1 is a perspective view of an assembled automobile chassis in accordance with the invention.

As shown in FIGS. 1-4, an automobile chassis 40 includes a first (front) bulkhead 42, a second bulkhead 44, a third bulkhead 46, a fourth bulkhead 48, a fifth bulkhead 50, a sixth bulkhead 52, and a seventh (rear) bulkhead 54. Bulkheads 42, 44 and 54, which are identical one-piece solid castings cast from a single type of aluminum alloy, include a trapezoidal central portion 42B, 44B, 54B, respectively, symmetrically disposed between opposed first and second outer portions, 42A and 42C, 44A and 44C, 54A and 54C, respectively, the contiguous central and outer portions of each bulkhead comprising a generally planar wall 42D, 44D, 54D, respectively. Each bulkhead 42, 44 and 54 further includes first and second shock tower assembly portions 42E, 44E, 54E and 42F, 44F, 54F, respectively, generally orthogonal to the walls 42D, 44D, 54D, respectively. A convention used herein is that having denoted by a reference number an element such as a casting which is fabricated as a single piece, portions of the one-piece element are denoted by the same number to which a letter suffix is added.

The third bulkhead 46 includes a generally planar W-shaped section 56 including a generally vertical middle portion 56B disposed symmetrically between two generally vertical outer portions 56A and 56C, the portions 56A, 56B and 56C being connected by a generally horizontal base portion 56D. Bulkhead 46 further includes a generally horizontal cross-piece section 58 including a middle portion 58B disposed between opposed end portions 58A, 58C. Sections 56 and 58 are cast from the same aluminum alloy as are bulkheads 42, 44 and 54.

The fourth bulkhead 48 includes a generally planar central portion 48A including a middle portion 48B and a base portion 48C identical to portions 56B and 56D, and opposed first and second angle-shaped frame support members 48E, 48F, each member including a base segment 48G, 48H, respectively, generally orthogonal to the base portion 48C, a brace segment 48I, 48J, respectively, disposed diagonally toward bulkhead 50, and a bracket segment 48K, 48L, respectively, generally orthogonal to central portion 48A. Bulkhead 48 is cast as a single piece from the same aluminum alloy as are bulkheads 42, 44 and 54.

Figure 2:
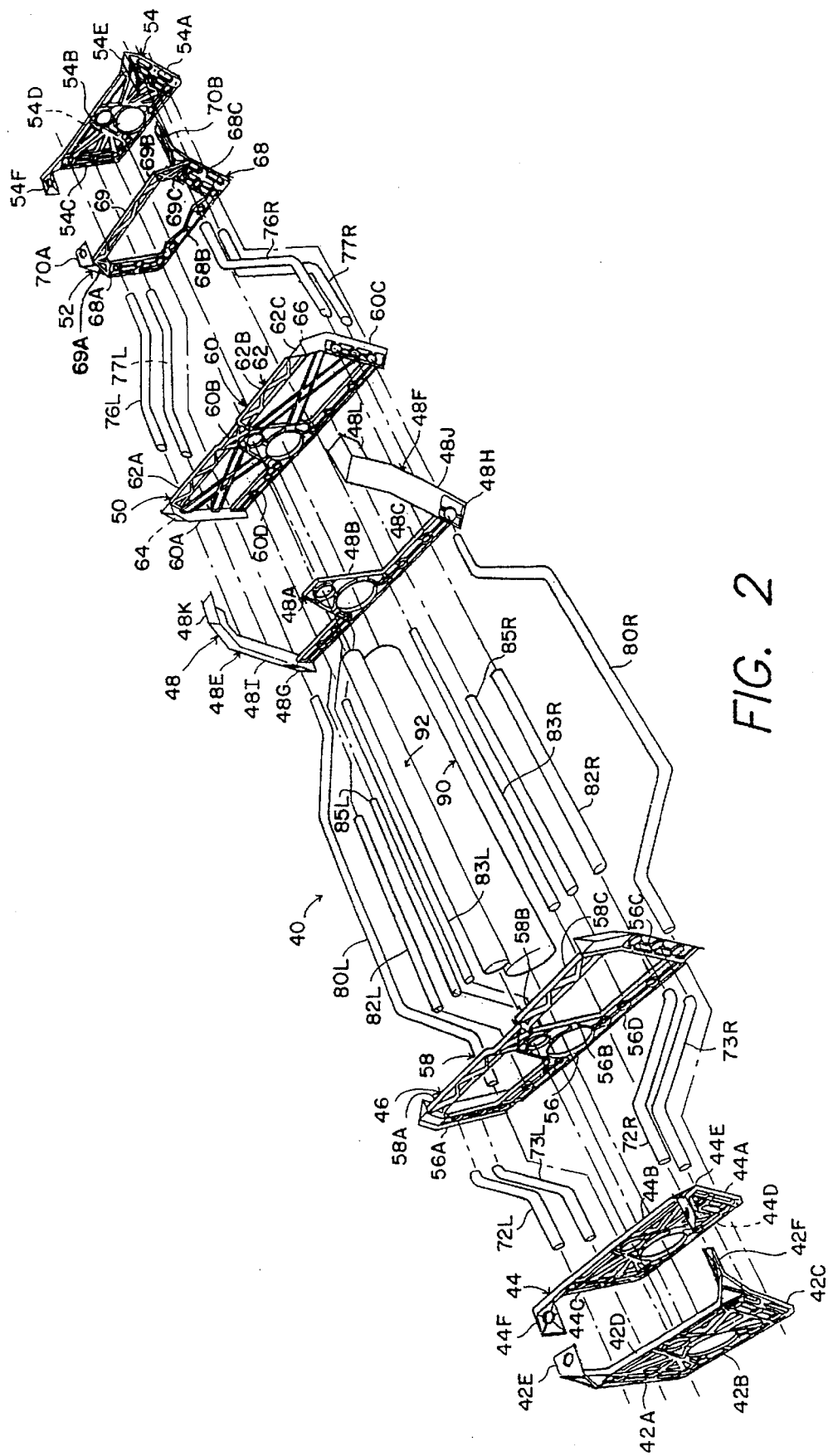
FIG. 2 is an exploded perspective view of the FIG. 1 chassis including first, second, third, fourth, fifth, sixth and seventh bulkheads, first and second backbone tubes, and a plurality of thinwall tubes.

The fifth bulkhead 50 includes a W-shaped section 60 including a middle portion 60B disposed symmetrically between two outer portions 60A and 60C, the portions 60A, 60B and 60C being connected by a generally horizontal base portion 60D, and a cross-piece section 62 including a middle portion 62B disposed between opposed end portions 62A, 62C, and opposed corners 63A, 63B. Sections 60 and 62 are identical to sections 56 and 58 of bulkhead 46. As best shown in FIG. 2, bulkhead 50 further includes first and second X-shaped ribbing sections 64, 66 connecting, respectively, portions 60A and 60B, and portions 60B and 60C. Sections 60, 62, 64 and 66 are cast from the same aluminum alloy as are bulkheads 42, 44 and 54.

The sixth bulkhead 52 includes a U-shaped section 68 including a base portion 68B disposed between opposed first and second obtusely angled outer portions 68A, 68C. Bulkhead 52 further includes a cross-piece section 69 including a generally horizontal portion 69B disposed between opposed first and second end portions 69A and 69C. Bulkhead 52 further includes opposed first and second shock tower assembly portions 70A, 70B generally orthogonal to portions 68A, 68C. Sections 68 and portions 70A, 70B are cast in a single piece from the same aluminum alloy as are bulkheads 42, 44 and 54. Section 69 is also cast from the same alloy.

Still referring to FIGS. 1–4, bulkheads 42, 44 and 46 are rigidly connected in their outer portions 42A, 44A, 56A and 42C, 44C, 56C, respectively, by opposed first and second pairs of relatively short, arcuate sections of thinwall tubing 72L, 73L and 72R, 73R, closely received within corresponding aligned holes in the outer portions. Bulkheads 50, 52 and 54 are rigidly connected in their outer portions 60A, 68A, 54A and 60C, 68C, 54C, respectively, by opposed third and fourth pairs of relatively short, arcuate sections of thinwall tubing 76L, 77L and 76R, 77R, closely received within corresponding aligned holes in the outer portions. Bulkheads 42, 44, 46, 48, 50, 52 and 54 are rigidly connected in their portions 42A, 44A, 56A, 48C, 60A, 68A, 54A and 42C, 44C, 56C, 48C, 60C, 68C, 54C, respectively, by opposed first and second relatively long, arcuate sections of thinwall tubing 80L and 80R closely received within corresponding aligned holes in the outer portions. Bulkheads 46, 48 and 50 are rigidly connected in their base portions 56D, 48C and 60B by opposed first and second pairs of relatively short, straight sections of thinwall tubing 82L, 83L and 82R, 83R which are closely received Within corresponding aligned holes in the base portions. Bulkheads 42, 44, 46, 48, 50, 52 and 54 are rigidly connected in their respective portions 42B, 44B, 56D, 48C, 60B, 68B and 54B by opposed first and second relatively long, arcuate sections of thinwall tubing 85L and 85R, disposed, respectively, between tubing sections 82L, 83L and 82R, 83R, which are closely received within corresponding aligned holes in the respective portions. Although tubes 85L, 85R are shown extending to bulkheads 44 and 42 in FIGS. 2 and 4, for overall clarity of FIG. 1 such extension is omitted therein. Tubing sections 72L, 72R, 73L, 73R, 76L, 76R, 77L, 77R, 80L, 80R, 82L, 82R, 83L, 83R, 85L, 85R are fabricated from the same aluminum alloy as are the bulkheads.

As shown in FIGS. 1 and 2, bulkheads 42, 44, 46, 48, 50 and 54 are rigidly connected in their respective portions 42B, 44B, 56B, 48B, 60B and 54B by generally cylindrical first (or lower) and second (or upper) backbone tubes 90 and 92 which are closely received within corresponding aligned holes in the respective portions. The major axis of tube 90 and major axis of tube 92 are parallel and are oriented generally horizontally with respect to chassis 40 so as to determine a plane which is generally vertical with respect to the chassis. Tubes 90 and 92 are fabricated from the same aluminum alloy as are the bulkheads and thinwall tubing sections.

Referring again to FIGS. 1, 2, 3 and 4, although bulkheads 42 and 44 are configured identically, bulkhead 44 is disposed within chassis 40 rotated 180 degrees about a vertical axis with respect to bulkhead 42. Thus, interfacing shock tower assembly portions 42E, 44F and 42F, 44E are rigidly connected to form first and second front shock mount receptacles 94L and 94R, as well as opposed upper lateral members 96L and 96R of a cage-like chassis portion bounded by bulkheads 42 and 44. Similarly, shock tower assembly portions 70A and 70B of bulkhead 52 interface with and are rigidly connected to, respectively, shock tower assembly portions 54F and 54E of bulkhead 54 to form first and second rear shock mount receptacles 98L and 98R, as well as opposed upper lateral members 100L and 100R of a cage-like chassis portion bounded by bulkheads 52 and 54.

Bracket segments 48I and 48J of bulkhead 48 are rigidly attached to, respectively, corners 62A and 62B of bulkhead 50, so that brace segments 48G and 48H are diagonal members of a chassis portion bounded by bulkheads 48 and 50.

B. FIRST, SECOND AND SEVENTH BULKHEADS

Figure 5:
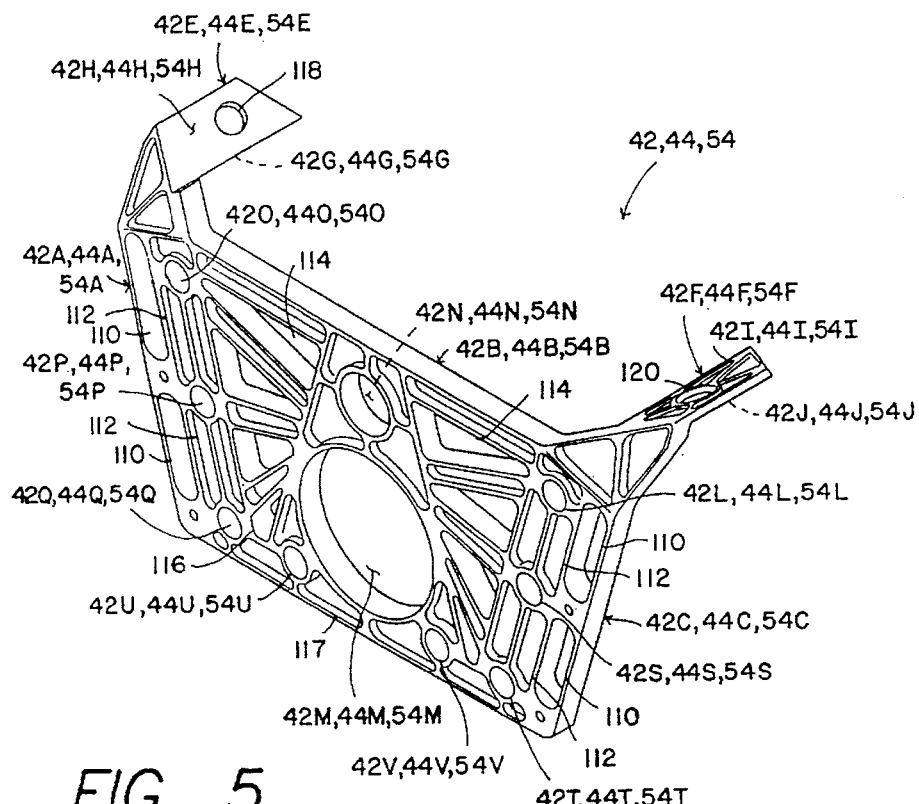
FIG. 5 is a perspective view of the one-piece first, second and seventh bulkhead of the FIGS. 1-2 chassis.
Figure 6A:
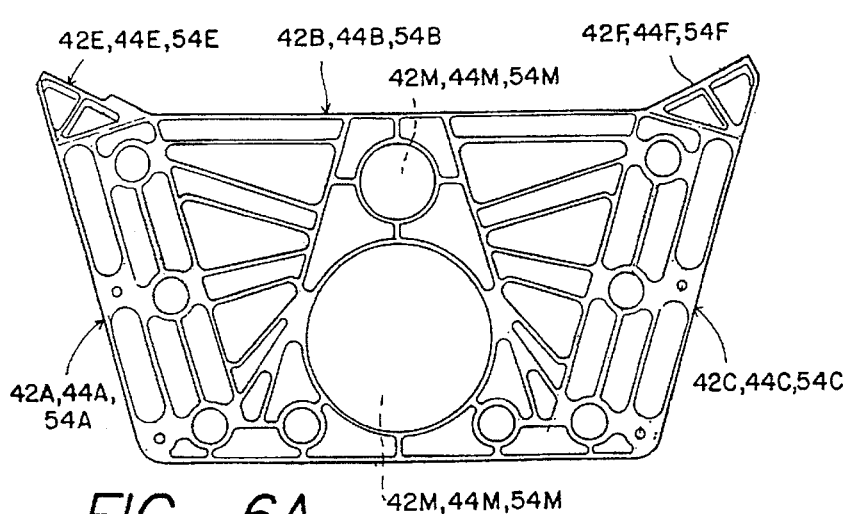
FIG. 6A is a front elevational view of the first bulkhead and a rear elevational view of the second and seventh bulkheads.
Figure 6B:
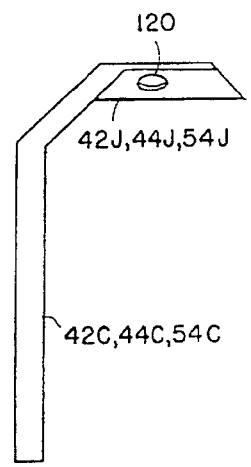
FIG. 6B is a right elevational view of the first bulkhead and a reverse left elevational view of the second and seventh bulkheads.
Figure 6C:
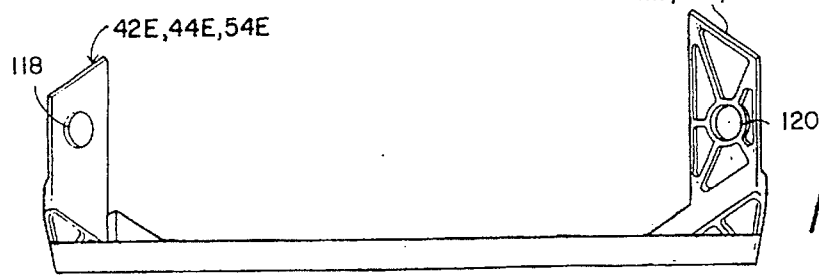
FIG. 6C is a top plan view of the first bulkhead and a rear top plan of the second and seventh bulkheads.

FIG. 5 shows a perspective view of bulkhead 42 as viewed from a position above and to the right of chassis 40. Viewed from the same position, bulkheads 44 and 54 appear to be rotated 180 degrees about a vertical axis with respect to bulkhead 42. FIG. 6A is a front elevational view of bulkhead 42 and a rear elevational view of bulkheads 44 and 54. FIG. 6B is a right elevational view of bulkhead 42 and a reverse left elevational view of bulkheads 44 and 54. FIG. 6C is a front top plan view of bulkhead 42 and a rear top plan view of bulkheads 44 and 54.

Referring to FIGS. 5 and 6A, central portions 42B, 44B, 54B of bulkheads 42, 44, 54, respectively, each include a lower backbone tube hole 42m, 44m, 54m, respectively, and an upper backbone hole 42n, 44n, 54n, respectively. The centers of holes 42m, 44m, 54m and 42n, 44n, 54n coincide, respectively, with the major axis of lower backbone tube 90 and upper backbone tube 92. Preferably, holes 42m, 44m, 54m are about 10-inches in diameter, and holes 42n, 44n, 54n are about 4-inches in diameter.

Outer portions 42A, 44A and 54A of bulkheads 42, 44 and 54, respectively, each include generally collinear upper, middle and lower holes 42o, 42p, 42q, and 44o, 44p, 44q, and 54o, 54p, 54q, respectively. Outer portions 42C, 44C and 54C of bulkheads 42, 44 and 54, respectively, each include generally collinear upper, middle and lower holes 42r, 42s, 42t, and 44r, 44s, 44t, and 54r, 54s, 54t, respectively. Central portions 42B, 44B and 54B each include, respectively, base holes 42u, 42v, and 44u, 44v, and 54u, 54v, respectively, which are generally collinear with lower holes 42q, 42t, and 44q, 44t, and 54q, 54t, respectively. Preferably, the collinear holes in the outer and central portions, and corresponding holes in bulkheads 46, 48, 50 and 52 are slightly larger than the thinwall tubing sections, i.e., about 2-inches in diameter. Outer portions 42A, 42C, 44A, 44C, 54A, 54C each include a plurality of oval-shaped holes 110 cast-in therethrough and a plurality of oval stampings 112. Central portions 42B, 44B, 54B each include a plurality of triangular holes 114 cast-in therethrough, a plurality of triangular stampings 116, and a plurality of lozenge-shaped stampings 117.

Referring to FIGS. 5, 6B and 6C, shock tower assembly portions 42E, 44E, 54E each include opposed planar surfaces 42G and 42H, 44G and 44H, 54G and 54H, respectively, having a circular hole 118 therethrough and a plurality of triangular stampings (not shown) on surface 42G. Shock tower assembly portions 42F, 44F, 54F each include opposed planar surfaces 42I and 42J, 44I and 44J, 54I and 54J, respectively, having a circular hole 120 therethrough and a plurality of triangular stampings 119 on surface 42I. Preferably, holes 118 and 120 are about 3-inches in diameter.

C. THIRD BULKHEAD

Figure 7A:
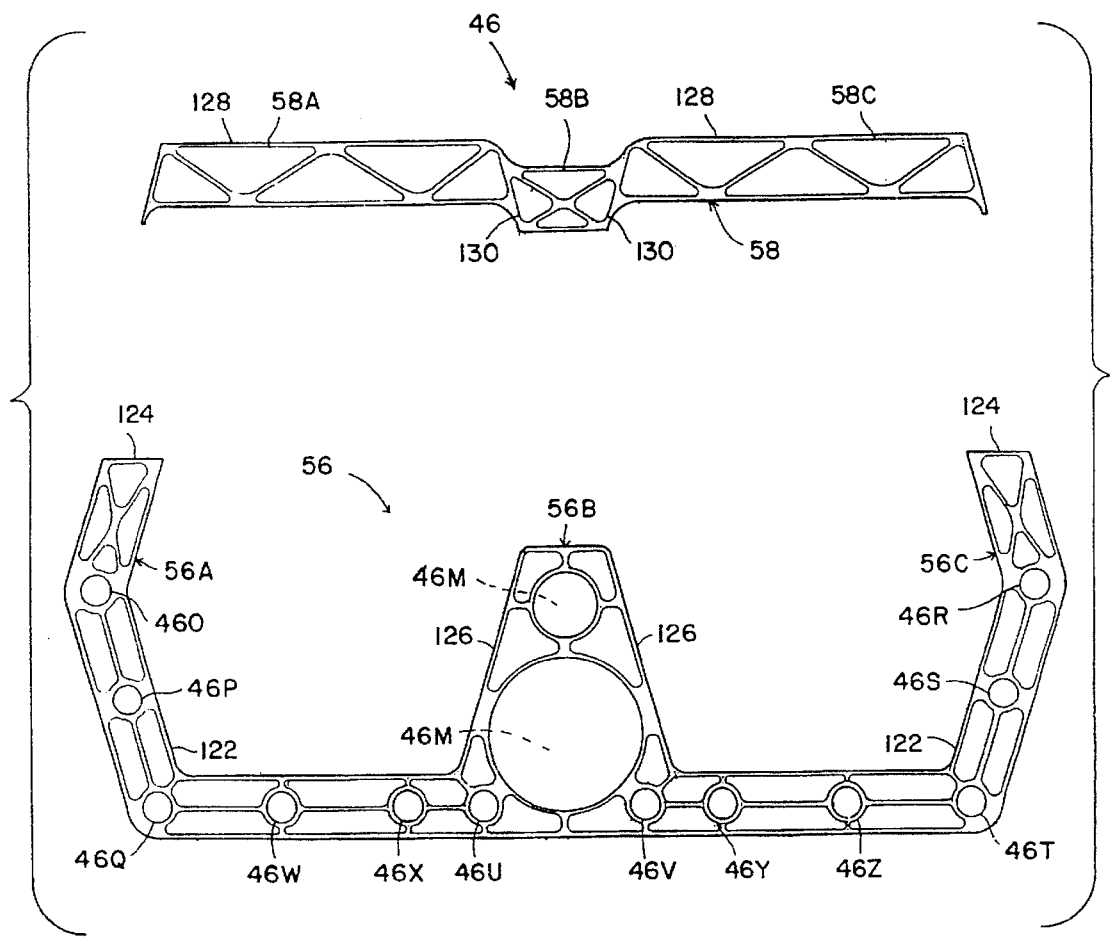
FIG. 7A is an exploded front elevational view of the third bulkhead of the FIGS. 1-2 chassis.
Figure 7B:
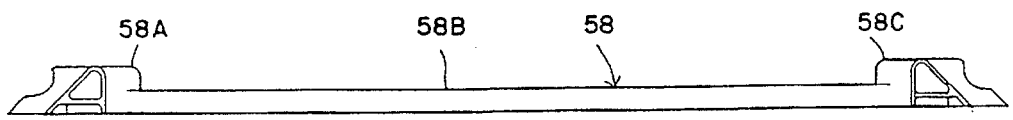
FIG. 7B is a top plan view of the FIG. 7A bulkhead.

Referring to FIGS. 7A and 7B, portion 56B of bulkhead 46 includes a lower backbone hole 46m and an upper backbone hole 46n of the same diameter as and aligned with holes 42m, 44m, 54m, and 42n, 44n, 54n, respectively. Outer portions 56A and 56C of bulkhead 46 include, respectively, generally collinear upper, middle and lower holes 46o, 46p, 46q, and 46r, 46s, 46t, respectively. Base portion 56D of bulkhead 46 includes base holes 46w, 46x, 46u, 46v, 46y, 46z, generally collinear with holes 46q and 46t. Portions 56A, 56B, 56C and 56D of W-shaped section 56 include pluralities of oval, triangular and lozenge-shaped stampings 122, 124, 126, respectively. Cross-piece section 58 includes first and second pluralities of triangular stampings 128, 130. Portions 56A, 56B, 56C of section 56 are rigidly connected, respectively, to portions 58A, 58B, 58C of section 58 by adhesives and a plurality of pop-rivets (not shown).

D. FOURTH BULKHEAD

Figure 8A:
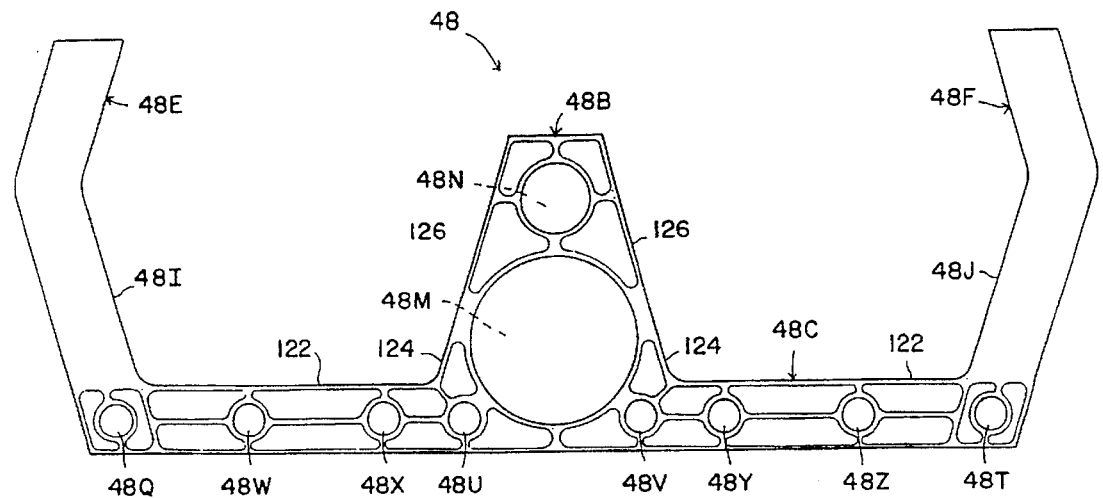
FIG. 8A is a front elevational view of the fourth bulkhead of the FIGS. 1-2 chassis.
Figure 8B:
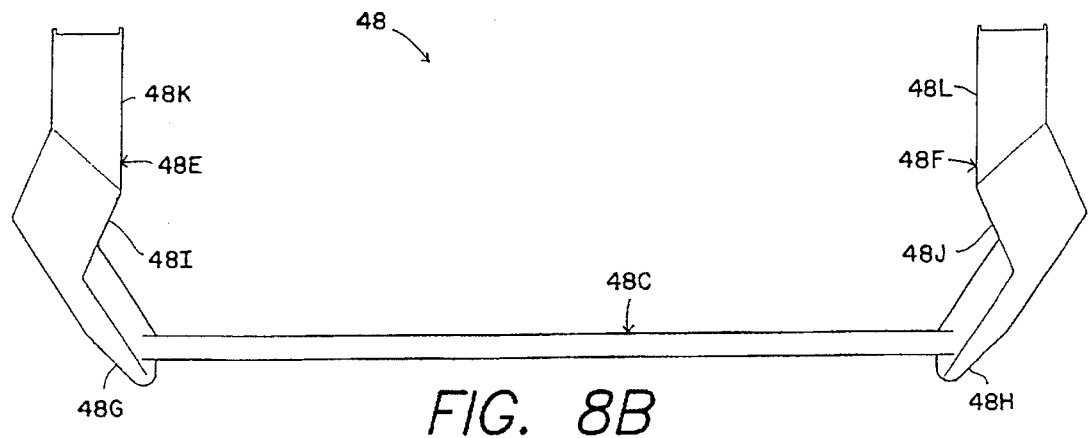
FIG. 8B is a top plan view of the FIG. 8A bulkhead.
Figure 8C:
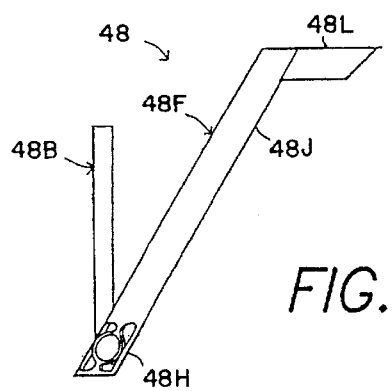
FIG. 8C is a side elevational view of the FIG. 8A bulkhead.

Referring to FIGS. 8A and 8B, portion 48B of bulkhead 48 includes lower and upper backbone holes 48m, 48n of the same diameter as and aligned with the bulkhead 42, 44, 46, 54 backbone holes. Base segments 48G, 48H of frame support members 48E, 48F include, respectively, a hole 48q, 48t. Base portion 48C includes base holes 48w, 48x, 48u, 48v, 48y, 48z, generally collinear with holes 48q and 48t. Portions 48B and 48C include pluralities of oval, triangular and lozenge-shaped stampings 122, 124, 126, respectively, identical to those of bulkhead 46.

Figure 3:
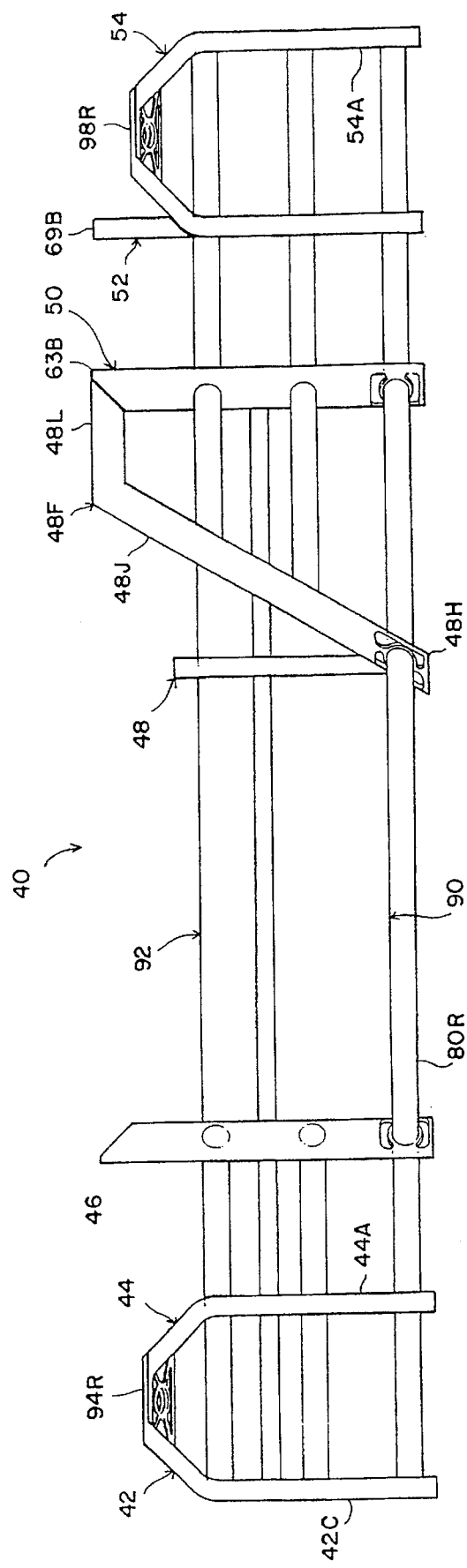
FIG. 3 is a side elevational view of the FIG. 1 chassis.
Figure 4:
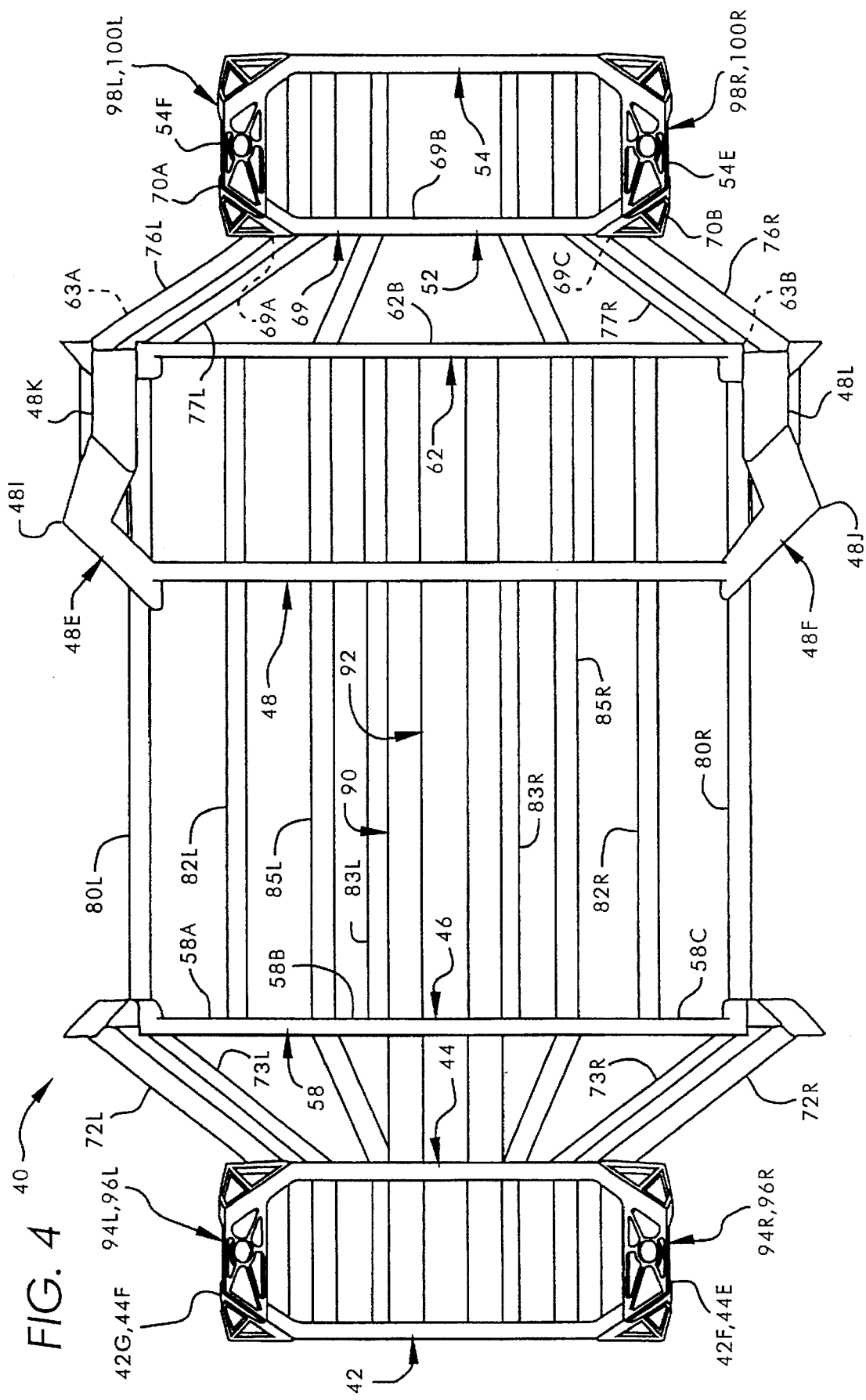
FIG. 4 is a top plan view of the FIG. 1 chassis.

As best shown in FIGS. 2 and 3, the angle-shaped brace segments 48I, 48J of frame support members 48E, 48F are disposed diagonally toward bulkhead 50 so that the angle-shaped bracket members 48K, 48L engage, respectively, corners 62A, 62B of cross-piece section 62 of bulkhead 50. Bracket members 48K, 48L are rigidly connected, respectively to corners 62A, 62B by adhesives and a plurality of pop-rivets (not shown).

E. FIFTH BULKHEAD

Figure 9:
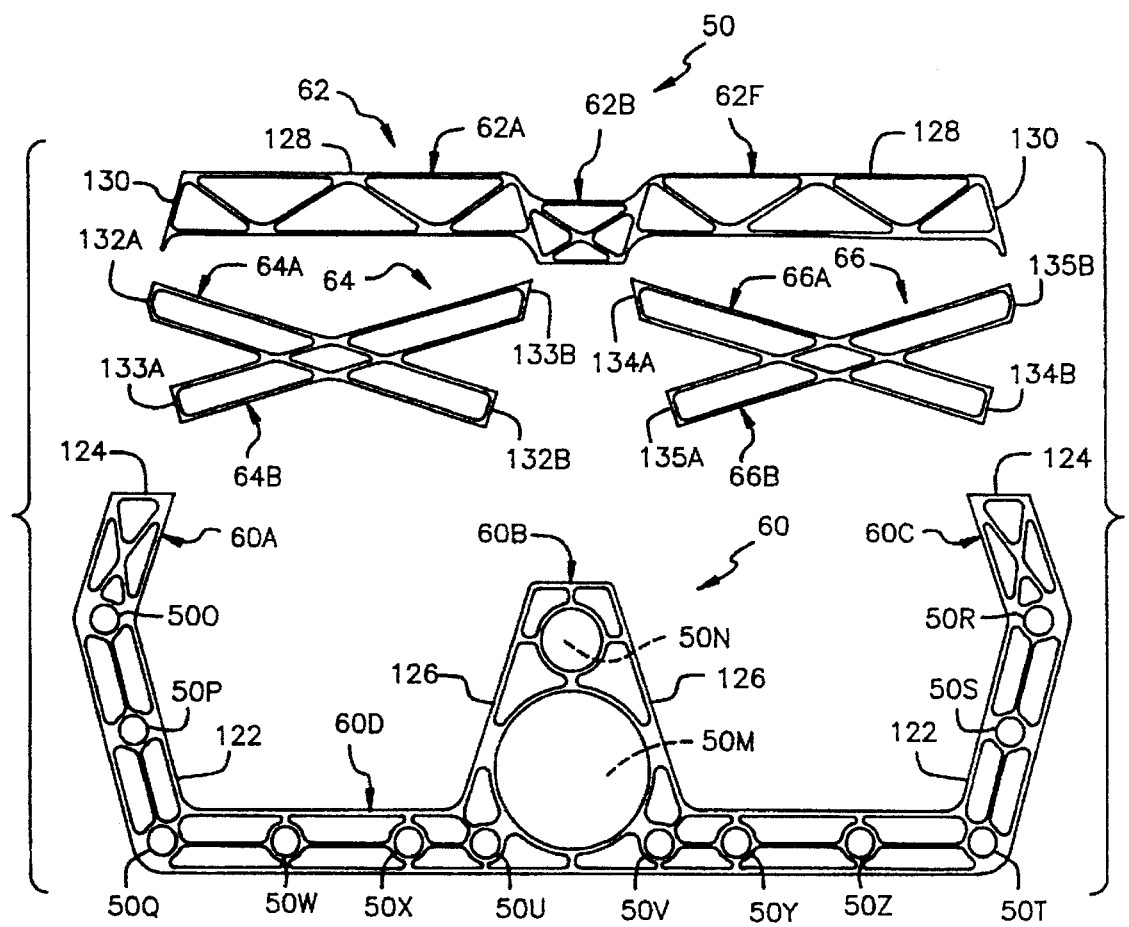
FIG. 9 is an exploded front elevational view of the fifth bulkhead of the FIGS. 1-2 chassis.
Figure 10:
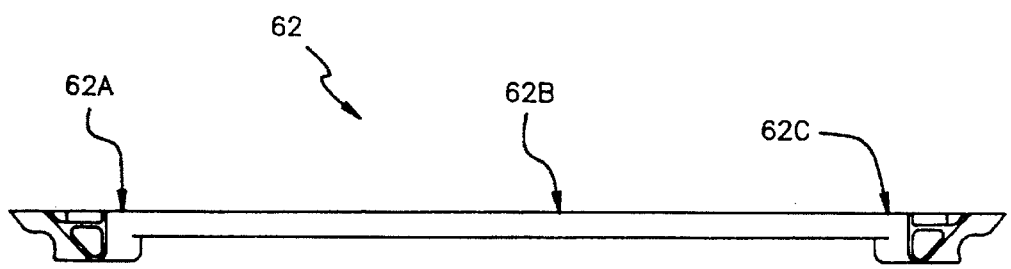
FIG. 10 is a top plan view of the FIG. 9 bulkhead.

Referring to FIGS. 9 and 10, portion 60B of W-shaped section 60 of bulkhead 50 includes lower and upper backbone holes 50m, 50n of the same diameter as and aligned with, respectively, holes 42m, 44m, 46m, 48m, 54m, and 42n, 44n, 46n, 48n, 54n. Outer portions 60A and 60C of bulkhead 50 include, respectively, generally collinear upper, middle and lower holes 50o, 50p, 50q, and 50r, 50s, 50t, respectively. Base portion 60D of bulkhead 50 includes base holes 50w, 50x, 50u, 50v, 50y, 50z, generally collinear with holes 50q and 50t. Portions 60A, 60B, 60C and 60D of section 60 include pluralities of oval, triangular and lozenge-shaped stampings 122, 124, 126, respectively, identical to those of section 56 of bulkhead 46. Cross-piece section 62 includes first and second pluralities of triangular stampings 128, 130 identical to those of section 58 of bulkhead 46. Portions 60A, 60B, 60C of section 60 are rigidly connected, respectively, to portions 62A, 62B, 62C of section 62 by adhesives and a plurality of pop-rivets (not shown).

Ribbing sections 64, 66 include, respectively, first and second cross-members 64A, 64B and 66A, 66B, each including, respectively, opposed ends (132A, 132B), (133A, 133B), (134A, 134B) and (135A, 135B). As best shown in FIGS. 1 and 2, ends 132A, 133A of cross-members 64A, 64B, respectively, are rigidly connected to outer portion 60A, and ends 132B, 133B are rigidly connected to middle portion 60B. Similarly, ends 134B and 135B of cross-members 66A, 66B, respectively, are rigidly connected to outer portion 60C, and ends 134A, 135A are rigidly connected to middle portion 60B. All connections are made using adhesives and a plurality of pop-rivets (not shown).

F. SIXTH BULKHEAD

Figure 11:
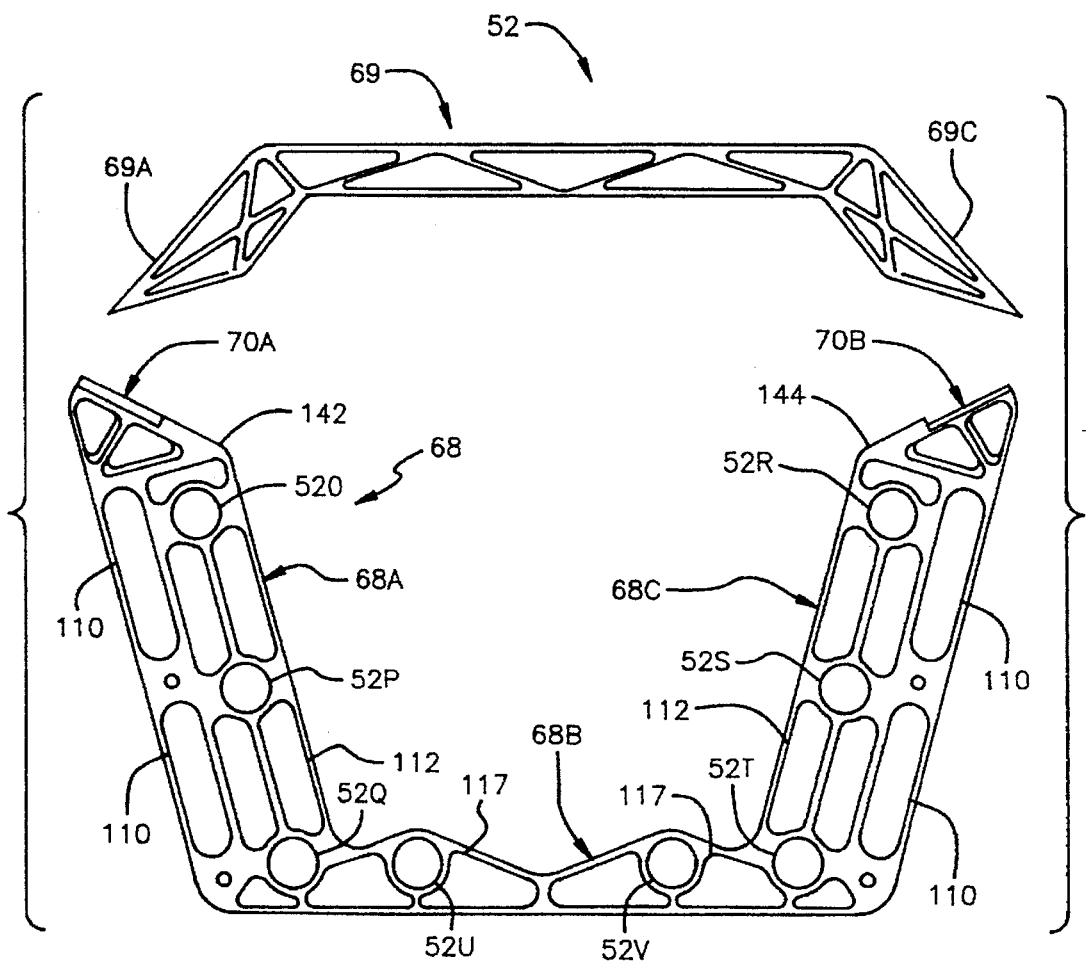
FIG. 11 is an exploded front elevational view of the sixth bulkhead of the FIGS. 1-2 chassis.
Figure 12:
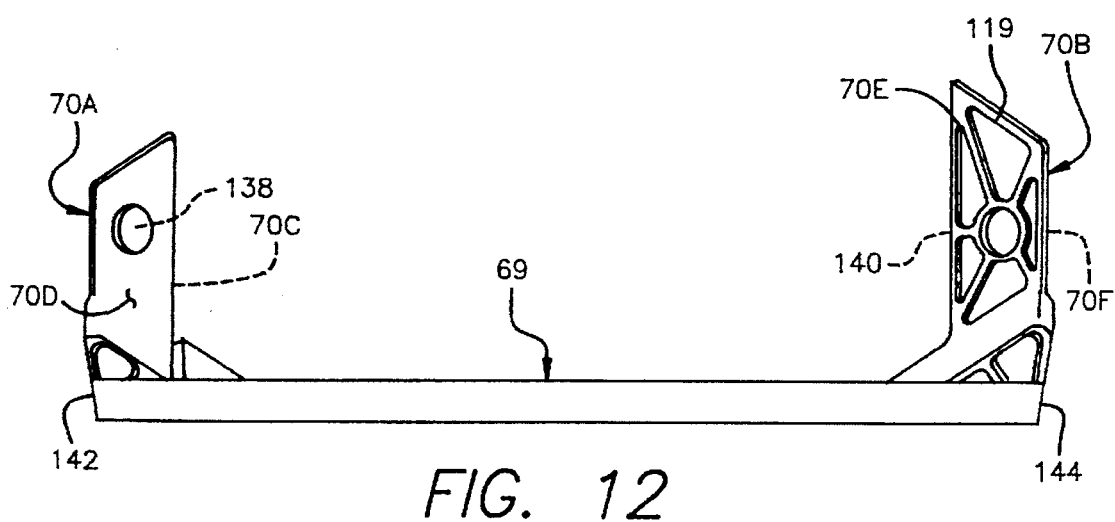
FIG. 12 is a top plan view of the FIG. 11 bulkhead.

Referring to FIGS. 11 and 12, outer portions 68A and 68C of section 68 of bulkhead 52 include, respectively, generally collinear upper, middle and lower holes 52o, 52p, 52q, and 52r, 52s, 52t, respectively. Base portion 68B of section 68 includes base holes 52u, 52v, which are generally collinear with holes 52q, 52t. Outer portions 68A and 68C each include a plurality of oval-shaped holes 110 cast-in therethrough and a plurality of oval stampings 112 identical to those of bulkheads 42, 44, 54. Base portion 68B includes a plurality of lozenge-shaped stampings 117 identical to those of bulkheads 42, 44, 54.

Shock tower assembly portion 70A includes opposed planar surfaces 70C, 70D having a circular hole 138 therethrough and a plurality of triangular stampings 119 on surface 70C (not shown). Shock tower assembly portion 70B includes opposed planar surfaces 70E, 70F having a circular hole 140 therethrough and a plurality of triangular stampings 119 on surface 70E.

End portions 69A, 69C of cross-piece section 69 are rigidly connected to outer portions 68A, 68C, respectively, using adhesives and a plurality of pop-rivets (not shown), at a right-angle junction 142 between portion 68A and portion 70A, and a right-angle junction 144 between portion 68C and portion 70B.

G. BACKBONE AND THINWALL TUBING

Referring to FIGS. 2, 6A, 7A, 8A and 9, lower backbone tube 90 is closely received within holes 42m, 44m, 46m, 48m, 50m, 54m, of bulkheads 42, 44, 46, 48, 50, 54, respectively, and upper backbone tube 92 is closely received within holes 42n, 44n, 46n, 48n, 50n, 54n, of bulkheads 42, 44, 46, 48, 50, 54, respectively. Preferably, tubes 90 and 92 have, respectively, a 10-inch and 4-inch outer diameter and a 1/16-inch wall thickness.

Referring to FIGS. 2, 6A and 7A, tubing section 72L is closely received within horizontally aligned holes 42o, 44r, 46o, and tubing section 73L is closely received within holes 42p, 44s, 46p. Tubing section 72R is closely received within holes 42r, 44o, 46r, and tubing section 73R is closely received within holes 42s, 44p, 46s.

Referring to FIGS. 2, 6A, 9 and 11, tubing section 76L is closely received within holes 50o, 52o, 54r, and tubing section 77L is closely received within holes 50p, 52p, 54s. Tubing section 76R is closely received within holes 50r, 52r, 54o, and tubing section 77R is closely received within holes 50s, 52s, 54p.

Referring to FIGS. 2, 7A, 8A and 9, tubing section 82L is closely received within holes 46w, 48w, 50w, and tubing section 83L is closely received within holes 46u, 48u, 50u. Tubing section 82R is closely received within holes 46z, 48z, 50z, and tubing section 83R is closely received within holes 46v, 48v, 50v.

Referring to FIGS. 2, 6A, 7A, 8A, 9 and 11, tubing section 80L is closely received within holes 42q, 44t, 46q, 48q, 50q, 52q, 54t, and tubing section 80R is closely received within holes 42t, 44q, 46t, 48t, 50t, 52t, 54q. Tubing section 85L is closely received within holes 42u, 44v, 46x, 48x, 50x, 52u, 54v, and tubing section 85R is closely received within holes 42v, 44u, 46y, 48y, 50y, 52v, 54u.

The backbone tubes 90, 92 and thinwall tubing sections 72L, 73L, 72R, 73R, 76L, 77L, 76R, 77R, 80L, 80R, 82L, 83L, 85L, 82R, 83R, 85R, are rigidly attached to the bulkheads using a heat-activated, slow-jelling, thermoplastic-based adhesive applied at each tube-bulkhead hole junction. Preferably, the tubing sections have a 2-inch outer diameter and a 1/16-inch wall thickness.

H. HONEYCOMB PANELS

FIG. 13A shows a partial front elevational view of an exemplary rectangular-shaped honeycomb panel 150 in accordance with a first embodiment and a second embodiment of the invention. Panel 150 includes a multiplicity of contiguous, rigidly attached hexagonal rods 152, each hollowed out to form a thin-wall hexagonal cross-section cell so that cells are disposed in a honeycomb pattern. Thus, FIG. 13A is also a transverse cross-sectional view of panel 150. FIG. 13B is a detail view of a small portion of panel 150. Exemplary panel 150 includes longitudinally therethrough three generally cylindrical holes 154a, 154b, 154c disposed to receive therethrough three parallel tubing sections such as 72L, 73L, 80L, or 72R, 73R, 80R. Depending on where a rectangular honeycomb panel is installed within chassis 40, the panel includes three or two holes disposed to receive therethrough a like number of adjacent, coplanar thinwall tubing sections.

Figure 14:
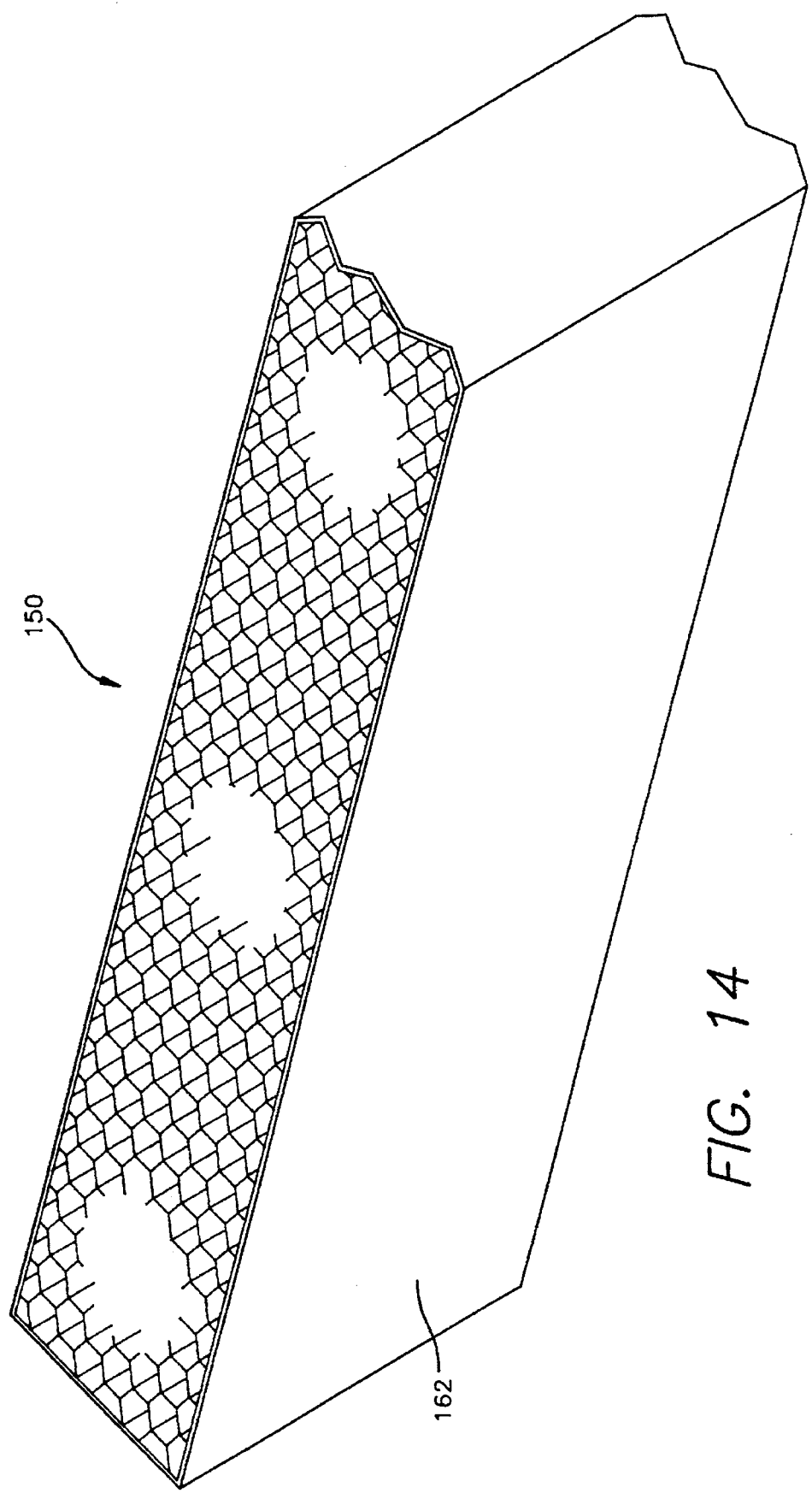
FIG. 14 is a perspective view of the FIG. 13A panel after injection with a thermoplastic material.

FIG. 14 shows the exemplary panel 150 after processing within a heated clamshell-type steel mold (not shown) adapted for rotomolding of thermoplastic. All panels become coated with a layer 162 of microballoon-reinforced polycarbonate thermoplastic and then are permeated with a foam created from an unreinforced grade of the same thermoplastic which fills the inter-cell interstices. Typically, rectangular panels have about a 40-inch length, an 8-inch depth, and a 4-inch transverse cross-section.

I. CHASSIS AND HONEYCOMB PANELS ASSEMBLY

Figure 15:
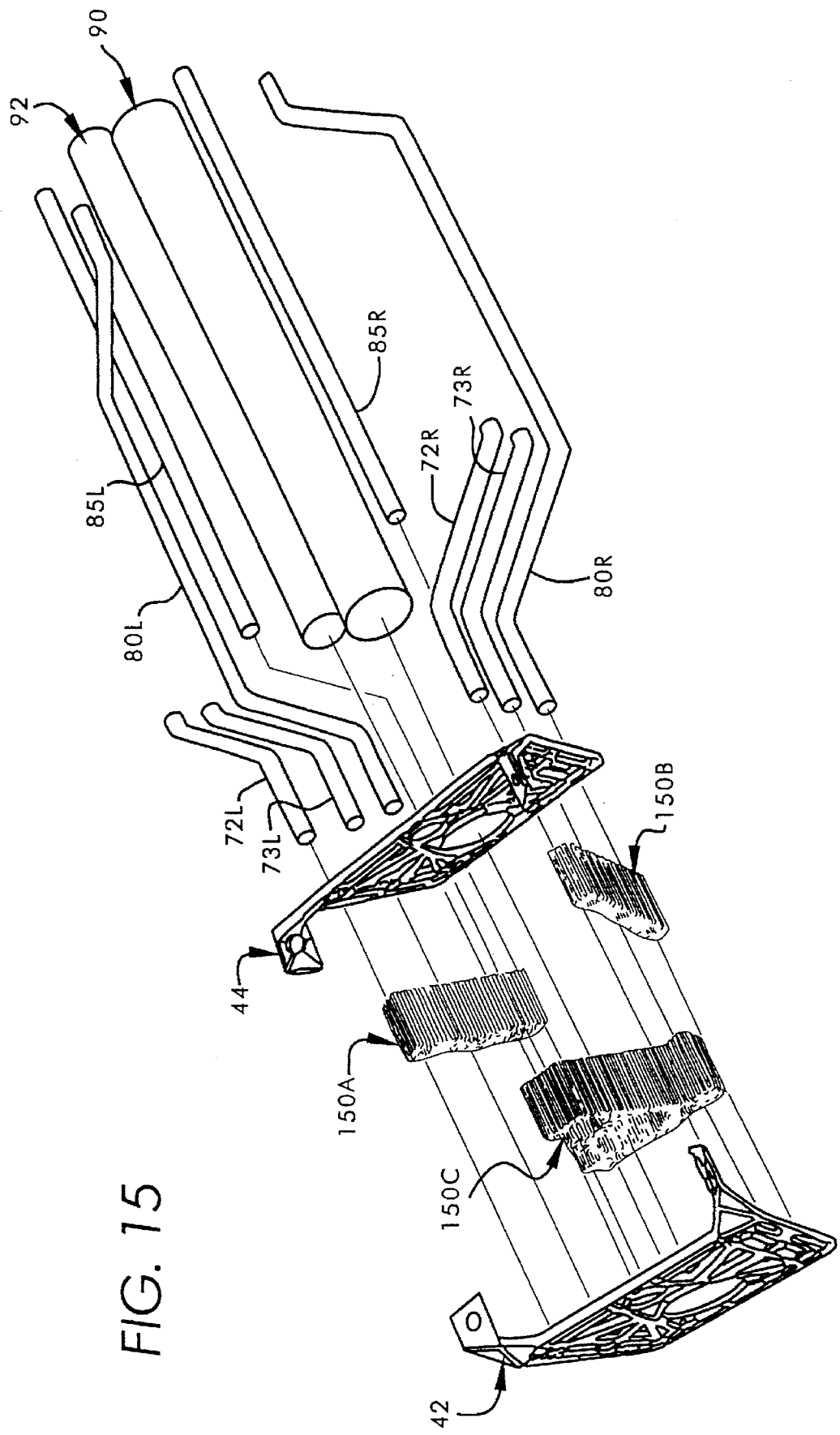
FIG. 15 is an exploded perspective view of the FIG. 2 first and second bulkheads, thinwall tubes connecting the bulkheads, first and second backbone tubes, and exemplary first, second and third honeycomb panels depicting stacks of panels disposed along the tubes and interposed between the bulkheads.

FIG. 15 shows how bulkheads, honeycomb panels, and tubing sections are assembled within the chassis 40. First and second stacks 165A, 165B of vertically oriented rectangular-shaped honeycomb panels, depicted schematically by single panels 150A and 150B, respectively, are positioned lateral surface-to-lateral surface and closely interposed between bulkheads 42 and 44, and receive therethrough tubing sections 72L, 73L, 80L, and 72R, 73R, 80R, respectively. Vertically oriented honeycomb panels in a third stack 165C, depicted schematically by trapezoidal-shaped panel 150C, are positioned lateral surface-to-lateral surface and closely interposed between bulkheads 42 and 44, and receive therethrough backbone tubes 90 and 92, and tubing sections 85L, 85R.

Figure 16:
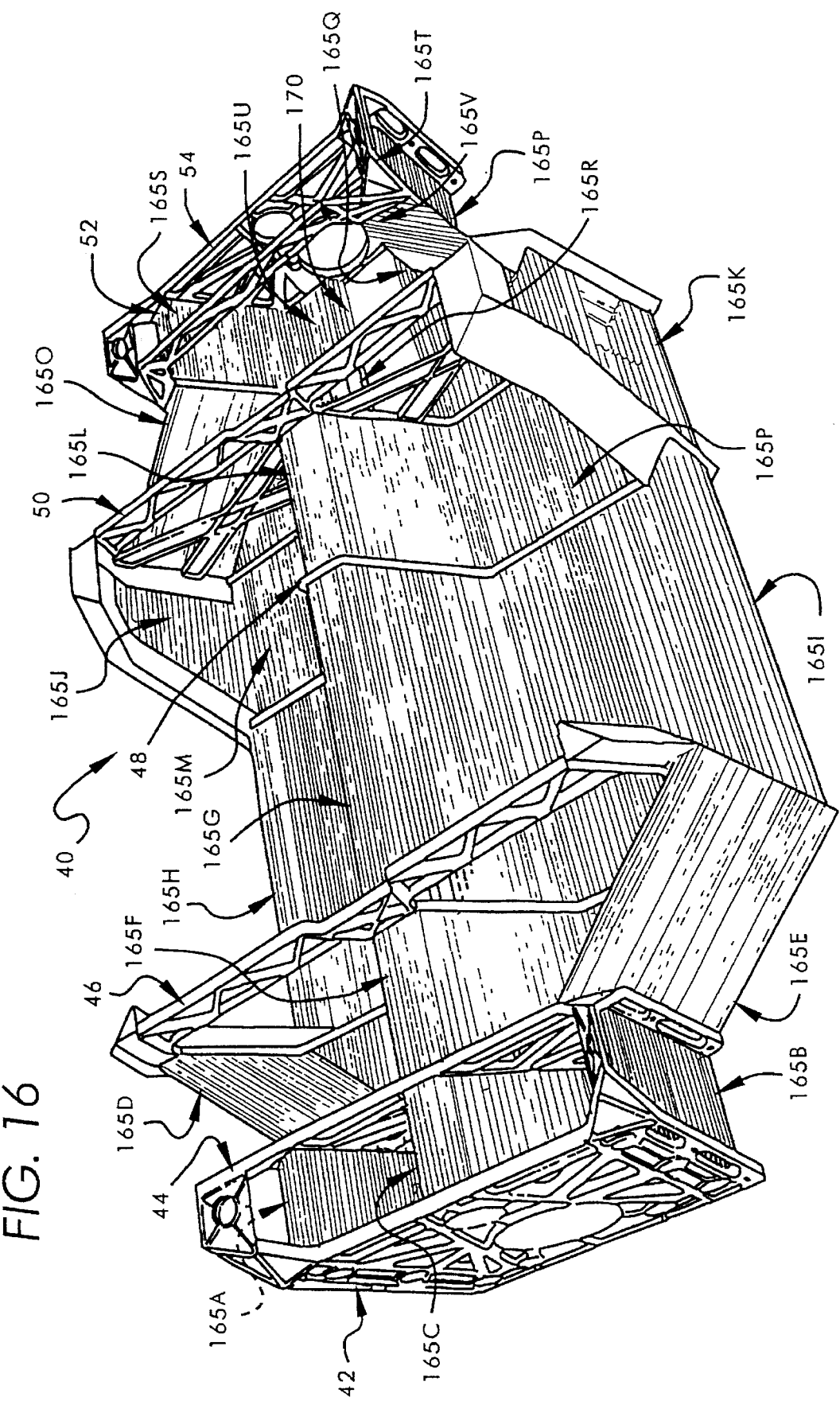
FIG. 16 is a perspective view of the FIG. 1 chassis with twenty-six stacks of honeycomb panels in place.

FIG. 16 shows chassis 40 assembled with the panel stacks 165A, 165B and 165C interposed between bulkheads 42 and 44. Fourth, fifth and sixth stacks 165D, 165E, 165F of vertically oriented panels are closely interposed between bulkheads 44 and 46. A seventh stack 165G of vertically oriented panels and eighth and ninth stacks 165H, 165I of horizontally oriented panels are closely interposed between bulkheads 46 and 48. Tenth, eleventh and twelfth stacks 165J, 165K, 165L of vertically oriented panels and thirteenth and fourteenth stacks 165M, 165N of horizontally oriented panels are closely interposed between bulkheads 48 and 50. Fifteenth and sixteenth stacks 165O, 165P of vertically oriented panels and seventeenth and eighteenth stacks 165Q, 165R of horizontally oriented panels are closely interposed between bulkheads 50 and 52. Nineteenth and twentieth stacks 165S, 165T of vertically oriented panels and twenty-first and twenty-second stacks 165U, 165V of horizontally oriented panels are closely interposed between bulkheads 52 and 54. Bulkheads 50, 52, 54 and stacks 165O, 165P, 165Q, 165R, 165S, 165T, 165U, 165V determine an engine enclosure module 170.

J. BODY FABRICATION AND CHASSIS-BODY INTEGRATION

After chassis 40 is positioned within a first (lower) portion of a clamshell-type mold (not shown), a second (upper) portion of the mold configured to fabricate a one-piece automobile body 180 is rigidly clamped to mold portion at a planar interface between the first and second portions, and a sealant is placed around the interface perimeter to prevent leakage of molten thermoplastic. In the first embodiment, a predetermined quantity of a single type of polycarbonate thermoplastic in the form of pellets reinforced with recyclable microballoons and sufficient to fill all cavities between the mold and chassis 40 up to about 3/4-inch from the chassis outer surfaces is introduced into the mold which is then loaded into an oven and heated to a predetermined temperature sufficient to melt the pellets. Preferably, the microballoons are high-strength glass microspheres composed of water-insoluble, chemically stable, soda-lime/borosilicate glass, available commercially as Scotchlite™ from 3M Corporation's Structural Products Department.

During heating, mold is rotated continuously about vertical and horizontal axes so that all surfaces within the mold become coated with thermoplastic, the biaxial rotation being at an angular speed sufficient to create a centrifugal force impelling the molten thermoplastic from the mold interior, and particularly away from hexagonal cells and interstices in the honeycomb panels toward mold surfaces external to the chassis. Thus, molten thermoplastic completely fills most of the cavities between the chassis 40 and interior mold surfaces. The mold is then cooled to a predetermined temperature to harden the polycarbonate thermoplastic now formed as a one-piece automobile body including pluralities of interior and exterior surfaces. The mold interior is then reheated to a predetermined temperature below the softening point of the thermoplastic but sufficiently high to maintain fluid flow of polycarbonate thermoplastic foam. A predetermined quantity of foam created from an unreinforced grade of the same polycarbonate thermoplastic is injected into the mold which is then rotated biaxially until chassis 40 is completely immersed in the foam and the foam has filled between the honeycomb cells and interstices and bonded with the corrugated interior and exterior body surfaces. The mold is then cooled to room temperature and the integrated chassis/body removed.

Alternatively, the thermoplastic used may be a mixture comprising polycarbonate and ABS, or a high strength polyimide resin.

Figure 17:
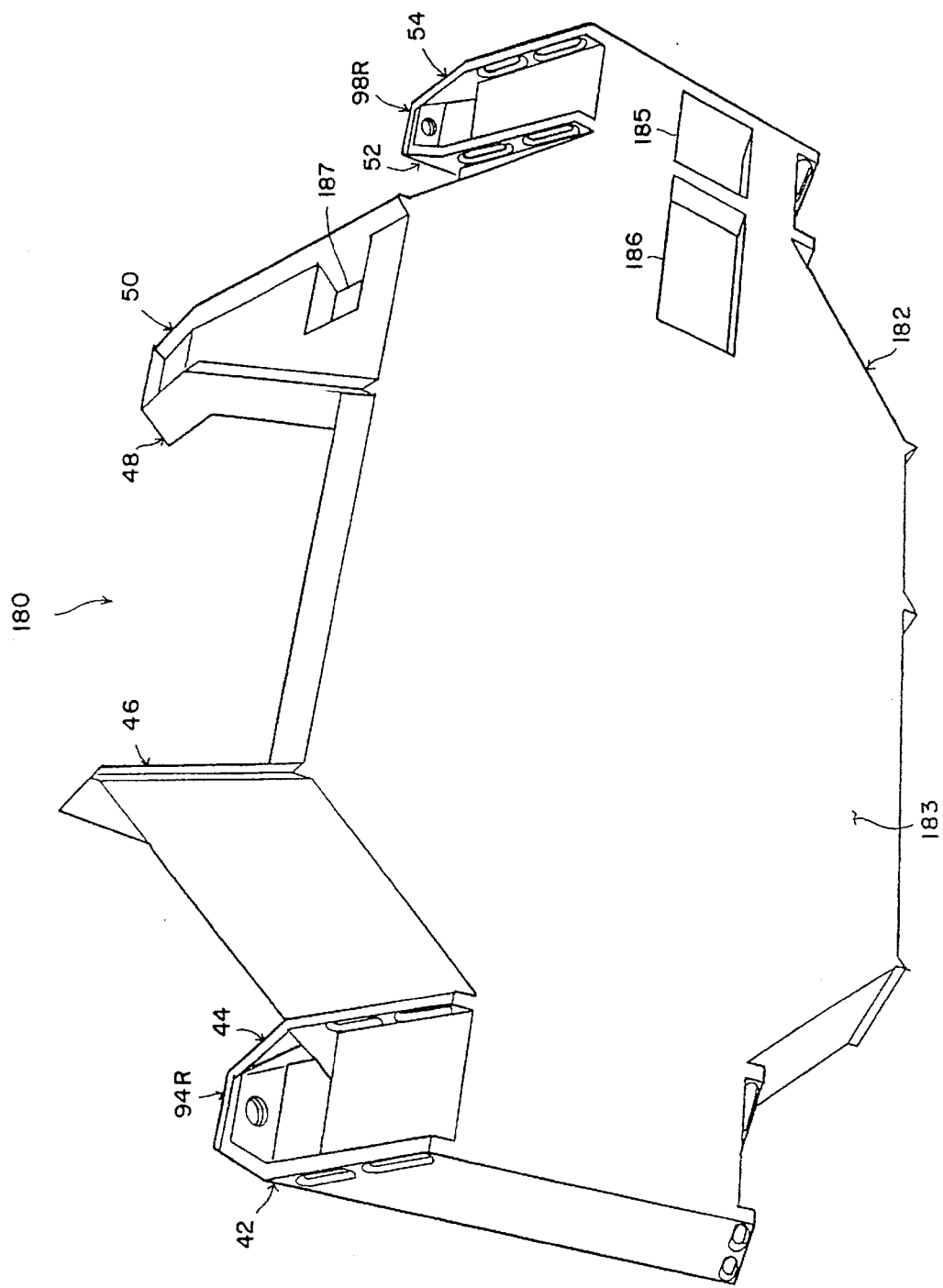
FIG. 17 is a bottom perspective view of the underbody of an automobile body fabricated and integrated with the FIG. 16 chassis within a rotomold.

FIG. 17 shows a bottom perspective view of the automobile body 180 after integration with the chassis 40. Body 180 includes a generally planar underbody 182 having a lower surface 183 and an upper surface 184 (not shown). Underbody 182 includes molded-in first and second engine service openings 185, 186 to provide access to an engine disposed within the engine enclosure module 170, and a molded-in engine air intake opening 187. Elements of chassis 40 visible in FIG. 17 include bulkheads 42, 44, 46, 48, 50, 52, 54, and shock mount receptacles 94R and 98R.

Figure 18:
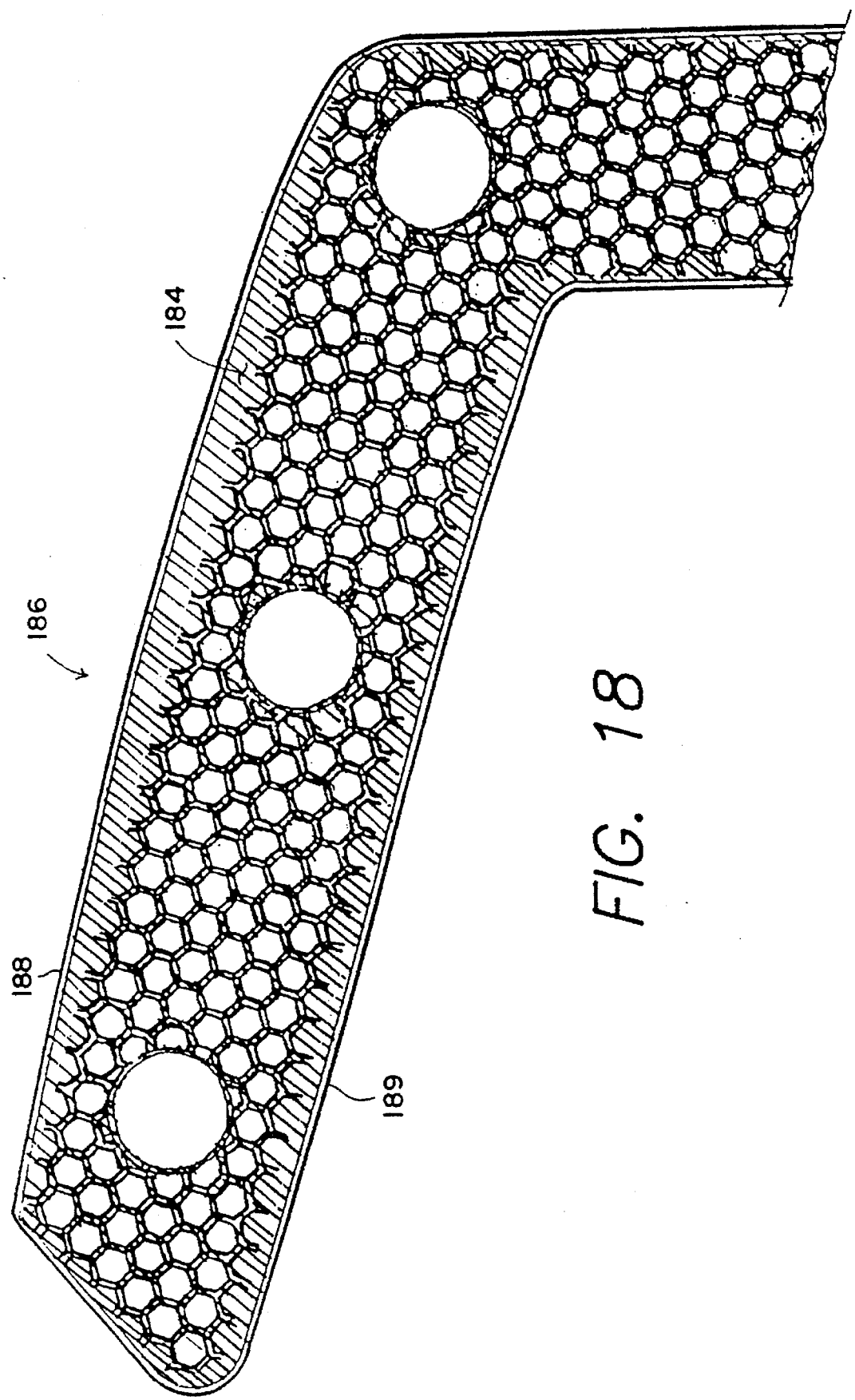
FIG. 18 is a transverse partial cross-sectional view of the FIG. 17 underbody after the FIG. 16 chassis and body are integrated.

FIG. 18 shows a transverse partial cross-section of a portion 186 of underbody 182 beneath surface 184 which includes a stack of horizontally disposed three-holed honeycomb panels. The panels are "sandwiched" between an upper layer 188 and a lower layer 189 of polycarbonate thermoplastic, and polycarbonate foam has permeated within and between the honeycomb cells.

K. BODY SUB-ASSEMBLIES

Figure 19:
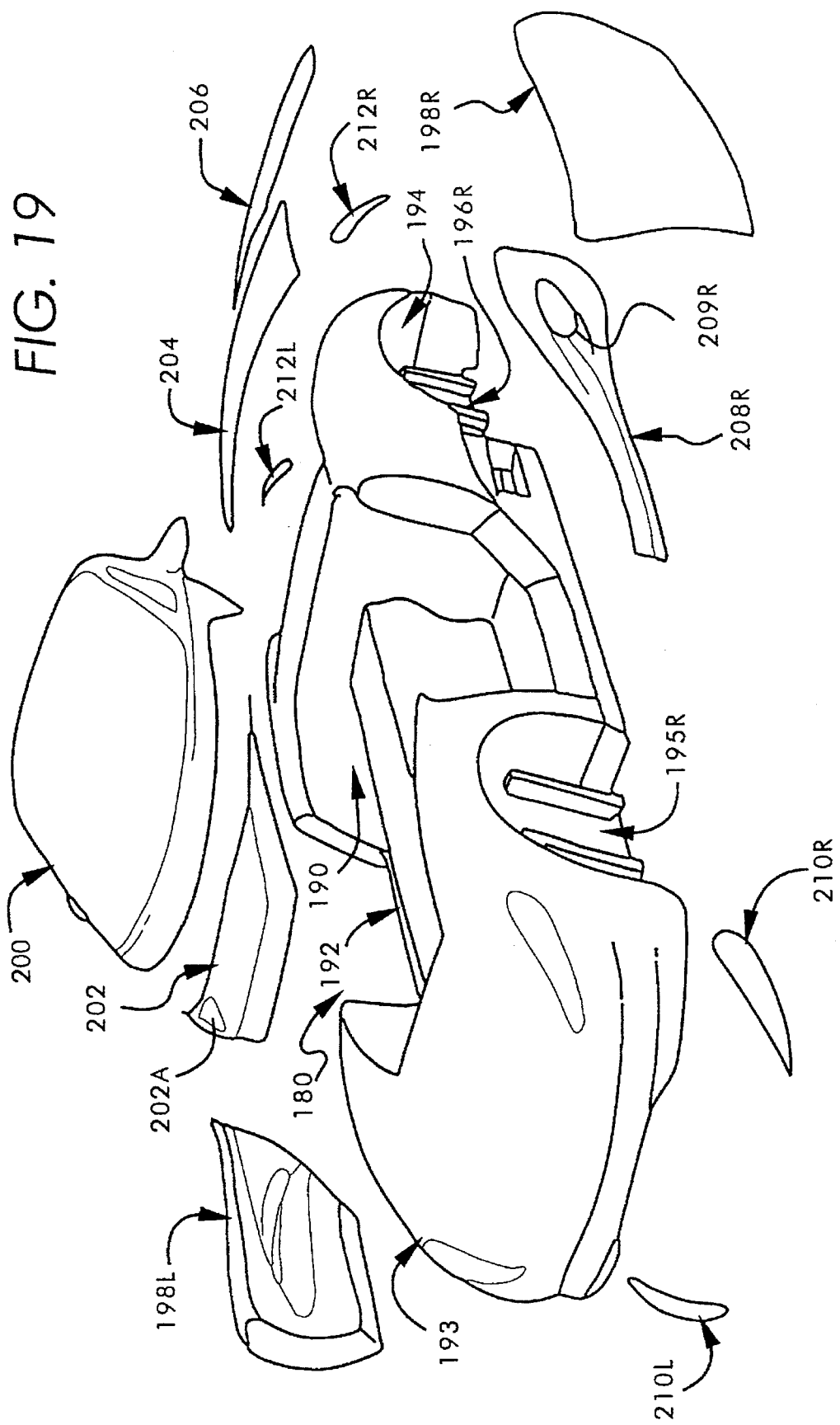
FIG. 19 is an exploded perspective view of the FIG. 17 body and a plurality of automobile parts bolted and/or glued onto the body exterior after the integrated chassis and body are removed from the rotomold.
Figure 21:
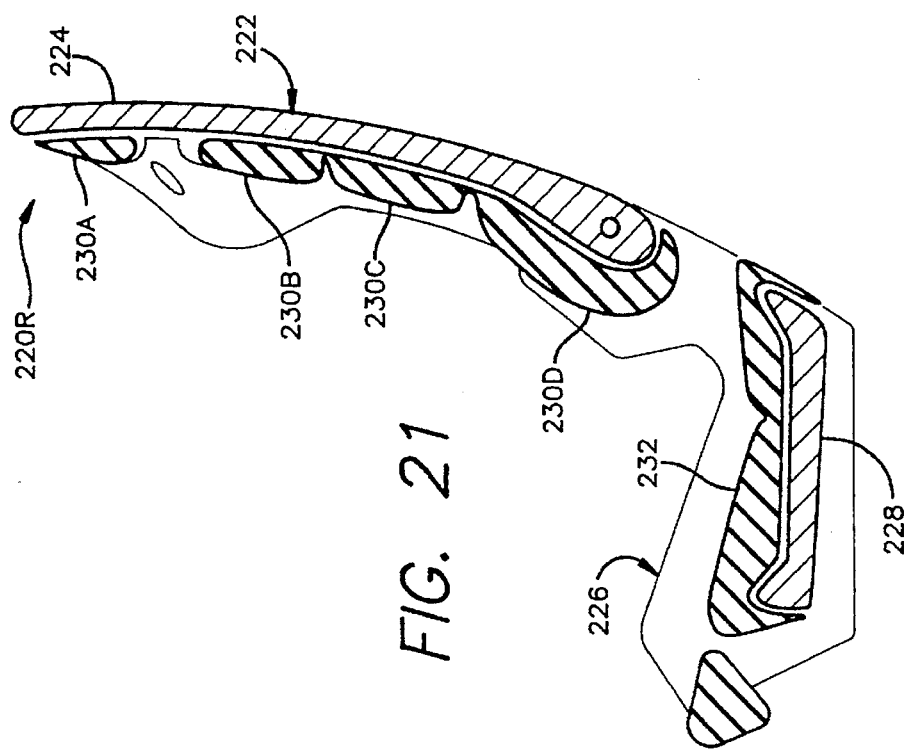
FIG. 21 is a combined side elevational view and partial cross-sectional view of the FIG. 20 passenger seat.
Figure 20:
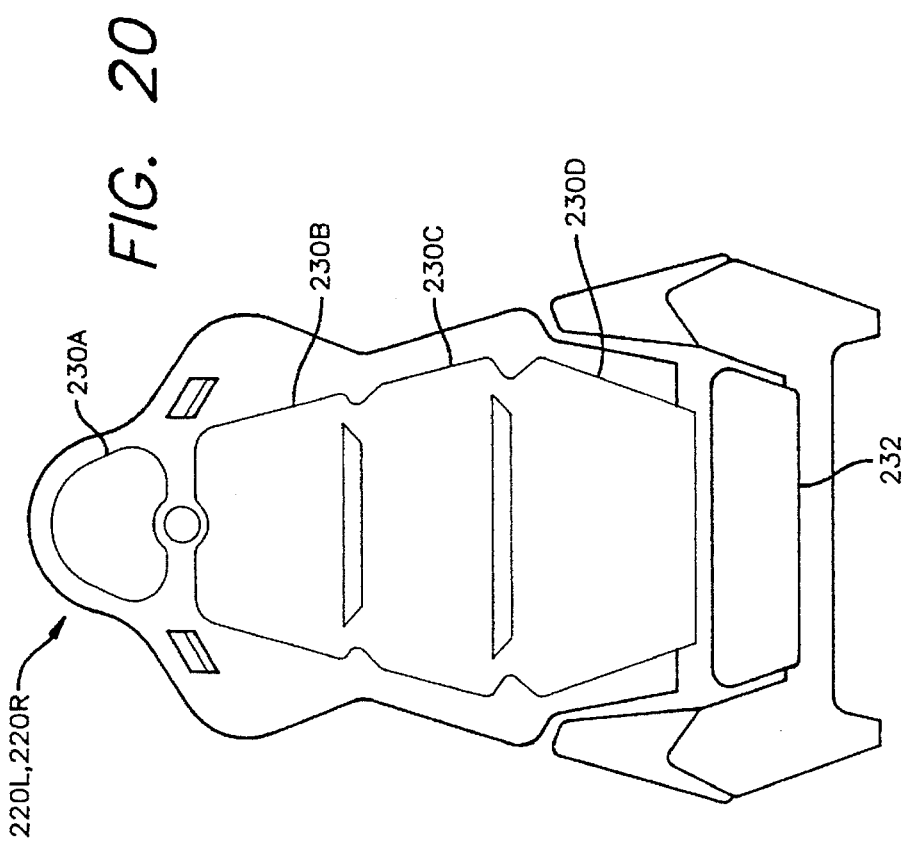
FIG. 20 is a front elevational view of a passenger seat in accordance with the invention.

FIG. 19 shows a top perspective view of the body 180 including a cockpit 190, a bulkhead enclosure 192, a front energy absorption structure 193, a rear energy absorption structure 194, first and second front wheel wells 195L (not shown), 195R, and first and second rear wheel wells 196L (not shown), 196R.

As also shown in FIG. 19, the integrated chassis/body accommodates attachment of standard modular parts, generally molded from thermoplastic, such as first and second doors 198L, 198R, an integrated windshield and header assembly 200, an access cowl 202 including a gas filler 202A, a combined engine cover and convertible top 204, a trunk assembly 206, first and second rocker panels 208L (not shown), 208R, each including an air intake 209L, 209R, respectively, first and second headlight assemblies 210L, 210R, and first and second taillight assemblies 212L, 212R. After being aligned with molded-in alignment pegs or holes on a surface of body 180, a modular part is attached to the body surface using adhesives and/or a plurality of rivets.

Referring to FIGS. 19, 20, 21 and 22, identical bucket-type seats 220L, 220R within cockpit 190 are disposed symmetrically with respect to bulkhead wall 192. Seats 220L, 220R include a back support section 222 having a shell 224 and a seat section 226 having a shell 228. Shells 222 and 224 are fabricated as honeycomb structures filled with a polycarbonate thermoplastic foam. Seats 220L, 220R also include first, second, third and fourth back support cushions 230A, 230B, 230C, 230D, and a seat cushion 232, each cushion including a low density thermoplastic foam and a multiplicity of inflatable air cells.

Figure 22:
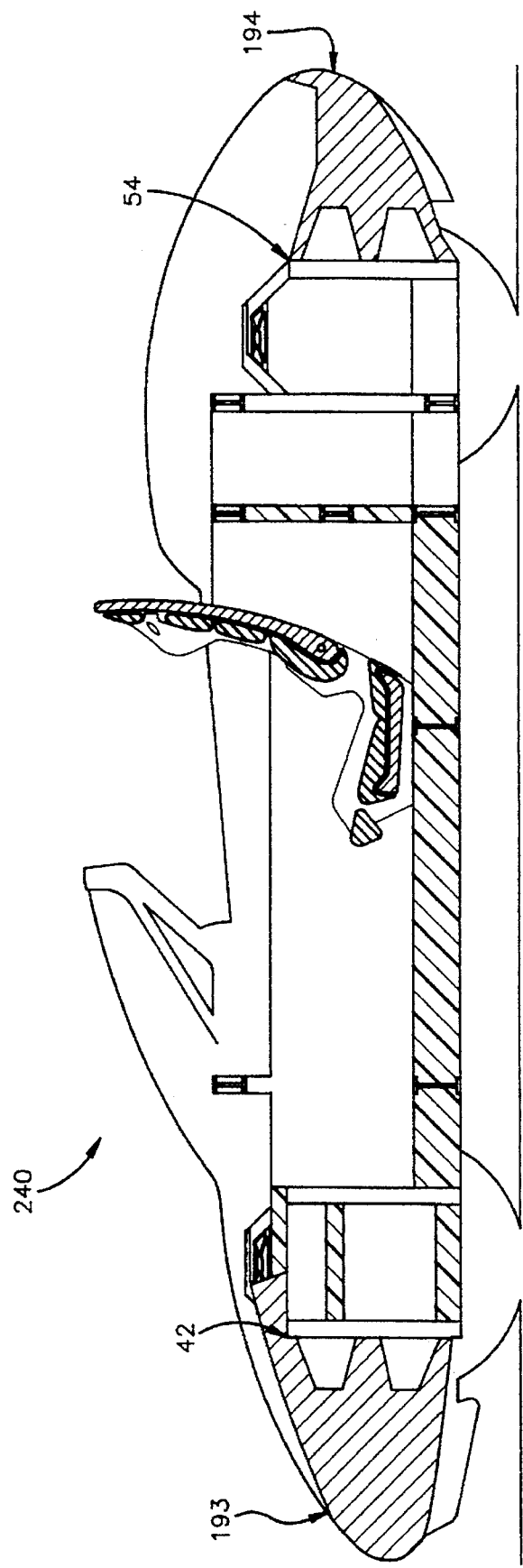
FIG. 22 is a partial cross-sectional view of an automobile incorporating the FIG. 16 integrated chassis and body, FIG. 20 seats, a forward energy absorption structure, and a rear energy absorption structure.

FIG. 22 shows an automobile 240 including the front and rear energy absoption structures 193, 194 which are rigidly attached, respectively, to chassis bulkheads 42 and 54. Referring to FIGS. 23 and 24, the energy absorption structure 193 includes a "crush zone" 246 having a plurality of crushable cones 248 fabricated from a low density polycarbonate thermoplastic foam, each cone disposed within a recess 250. Similarly, the energy absorption structure 194 includes a crush zone 252 having a plurality of cones 254 disposed within recesses 256.

II. SECOND PREFERRED EMBODIMENT

A second preferred embodiment is directed to an ultra-high strength integrated chassis/body such as may be desirable for small city buses, light-rail cars, or off-road vehicles. The bulkheads, backbone tubes, thinwall tubing sections and honeycomb panels of a chassis, and a rotomolded body are the same as in the first embodiment. However, after the chassis is positioned within the a clamshell mold and the mold is clamped and sealed, the mold interior is preheated to the melting point of a liquid crystal polymer thermoplastic and a first quantity of glass microfiber-reinforced LCP thermoplastic is introduced into the mold interior as the mold is rotated biaxially at an angular speed sufficient to centrifugally impel liquefied LCP toward the mold interior surfaces. While maintaining the mold interior at the LCP melting temperature, a second quantity of the same reinforced LCP thermoplastic is introduced directly into the chassis interior as the mold is rotated biaxially at an angular rate sufficient to isotropically distribute liquefied LCP within the honeycomb panel cells. Thus, no thermoplastic foam is used in the integrated chassis/body of the second embodiment.

The second embodiment also includes the two bucket-type seats 220L, 220R, and the front and rear energy absorption structures 193, 194 of the first embodiment. Thus, while microfiber-reinforced LCP thermoplastic is used exclusively in the integrated chassis/body, polycarbonate thermoplastic foam is used in the seats and energy absorption structures.

III. THIRD PREFERRED EMBODIMENT

Figure 25:
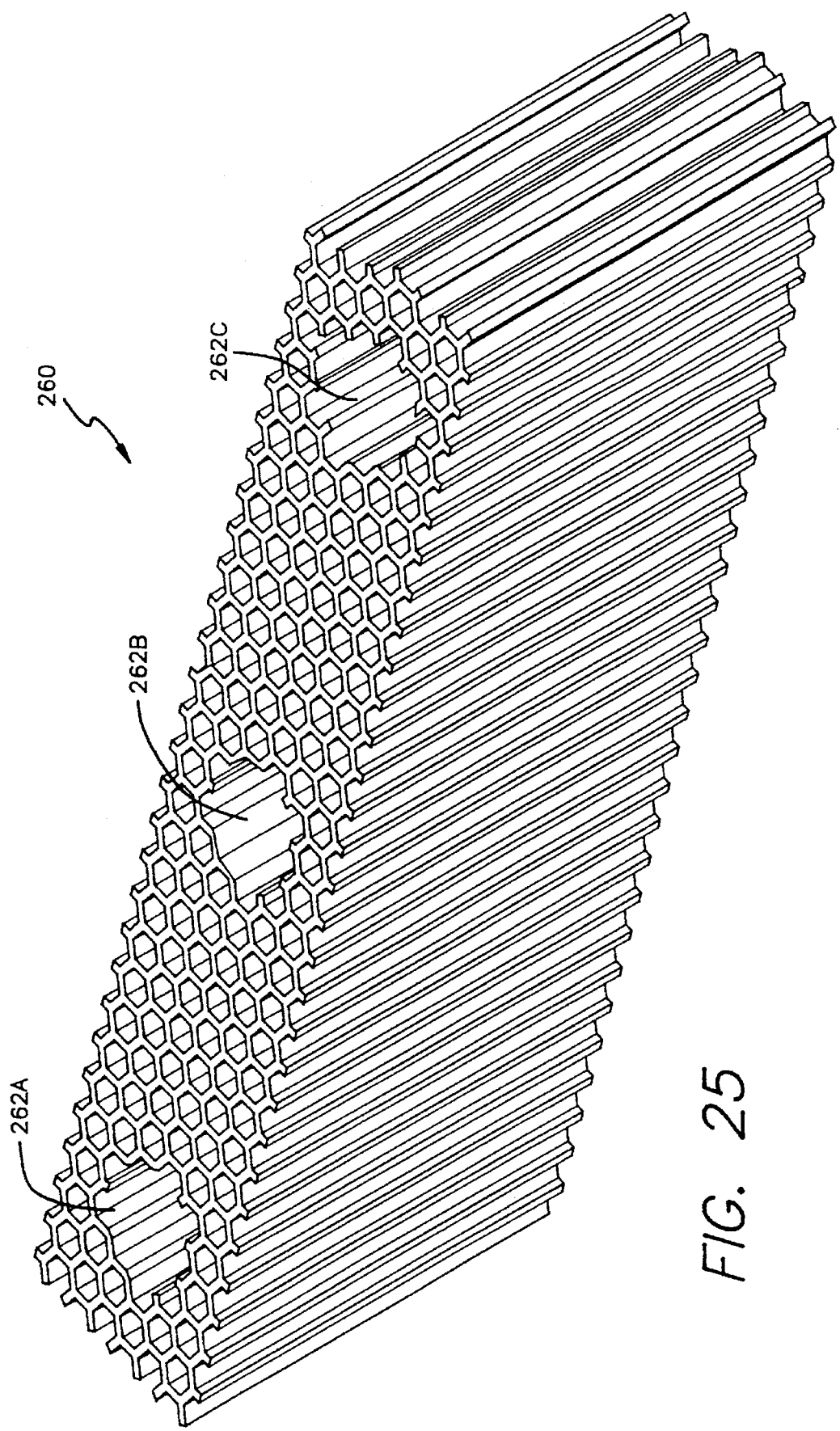
FIG. 25 is a perspective view of a micro-honeycomb block in accordance with a third embodiment of the invention.
Figure 26:
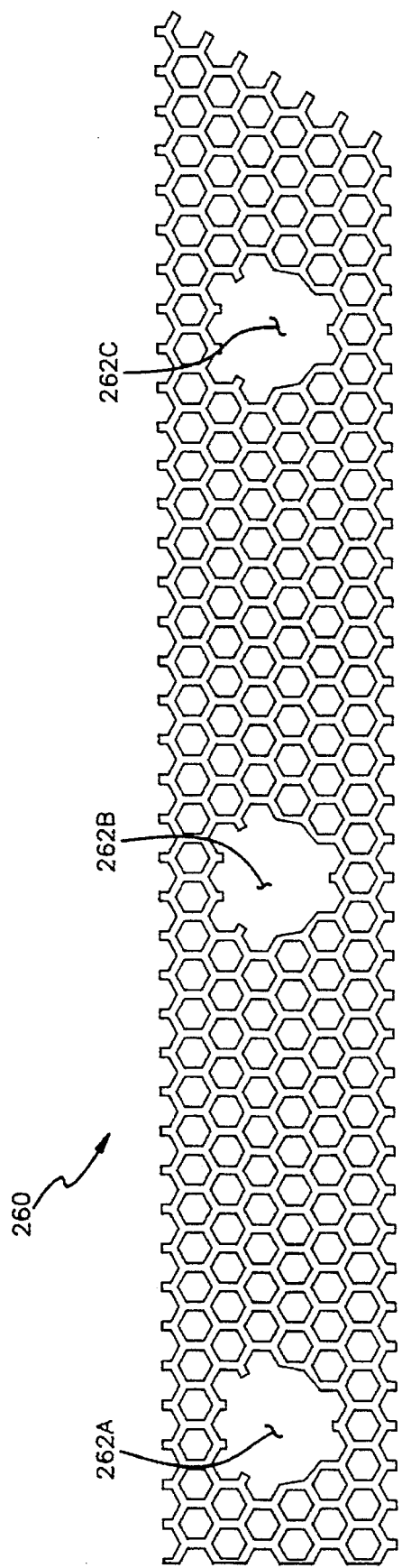
FIG. 26 is a cross-sectional view of the FIG. 25 block.

In a third preferred embodiment, a chassis includes the same bulkheads, backbone tubes and tubing sections, and a one-piece rotomolded thermoplastic body has the same dimensions as in the first and second embodiments. However, pluralities or multiplicities of relatively thick polycarbonate micro-honeycomb blocks, each including a multiplicity of hex-cells having an outer diametric dimension of about ½-inch, are used instead of stacks of relatively thin honeycomb panels. FIG. 25 shows a panel 260, fabricated according to the third embodiment, which is geometrically similar to the FIG. 14 panel. Panel 260 includes three generally parallel holes 262A, 262B, 262C, for inserting therethrough thinwall tubing sections. FIG. 26 shows a cross-section of the FIG. 25 panel in a plane perpendicular to the axes of the tubing holes. Referring to FIG. 16, it will be apparent that any or all of the stacks 165A–165V can be fabricated in a mold as a relatively large unitary thermoplastic structure without aluminum honeycomb. Alternatively, multi-block sub-assembly structures of various shapes conforming to chassis interior contours can be assembled by gluing together appropriate numbers and shapes of blocks. Using injection molding, individual MHC blocks or multi-block structures are covered with a low density polycarbonate thermoplastic foam before being attached to and inserted within the chassis.

After the chassis 40C including a plurality of sub-assemblies of foamed MHC blocks rigidly attached to the bulkheads, backbone tubes, and tubing sections are positioned within mold, the mold is clamped and sealed. Pellets of an unreinforced grade of the same polycarbonate thermoplastic used for foaming the MHC are introduced into the mold after the interior is heated to the polycarbonate melting point. The mold is then rotated biaxially at an angular speed sufficient to centrifugally impel liquefied polycarbonate toward the mold interior surfaces and fill cavities between the MHC block sub-assemblies and chassis bulkheads and tubing.

Compared to the first and second embodiments, the third embodiment provides simpler chassis assembly, and also simplifies rotomolding to a one-step process.

The third embodiment also includes the two bucket-type seats 220L, 220R, and the front and rear energy absorption structures 193, 194 of the first and second embodiments.

Although the preferred embodiments shown in the drawings are described herein in detail, the present invention is open to various modifications and alternative constructions. It is to be expressly understood that there is no intention to limit the invention to the particular forms disclosed. On the contrary, it is intended that the invention cover all modifications, equivalences and alternative constructions falling within the spirit and scope of the invention as expressed in the appended claims. In particular, the number of chassis bulkheads may be less or more than seven, the configurations of individual bulkheads as to sections and portions of sections are not limited to the particular designs disclosed, and the number, shape, and disposition of thinwall tubing sections connecting the bulkheads are not limited to the particular configurations disclosed.

What is claimed is:

1. An automobile chassis comprising:

a plurality of generally parallel planar bulkheads, each bulkhead fabricated from a single common type of metal alloy and perpendicular to and aligned generally transversely and symmetrically relative to a common generally horizontal longitudinal axis, and including a lower portion terminating in a generally horizontal lower edge, a first plurality of holes therethrough disposed generally vertically in a first outer bulkhead portion terminating in a first vertical outer edge, a second plurality of holes therethrough disposed generally vertically in a second outer bulkhead portion terminating in a second and opposite vertical outer edge, and first and second central holes therethrough disposed vertically in a middle bulkhead portion between the first and second outer portions, so that corresponding successive holes are aligned congruently and horizontally;

a plurality of tubes fabricated from the metal alloy, each tube closely received within and disposed through a plurality of successive congruently and horizontally aligned holes;

means for preventing compressive deformation of the bulkheads and tubes due to a high-load impact on the chassis applied parallel to the horizontal axis; and means for preventing compressive deformation of the bulkheads and tubes due to a high-load impact on the chassis applied transverse to the horizontal axis.

2. The automobile chassis of claim 1, wherein said metal alloy is an aluminum alloy.

3. The automobile chassis of claim 1, wherein said means for preventing compressive deformation of the bulkheads and tubes due to a high-load impact on the chassis applied parallel to the horizontal axis comprises first and second pluralities of generally planar panels disposed generally vertically and interposed between, respectively, the first and second outer portions of each consecutive pair of bulkheads.

4. The automobile chassis of claim 1, wherein said means for preventing compressive deformation of the bulkheads and tubes due to a high-load impact on the chassis applied transverse to the horizontal axis comprises first and second pluralities of generally planar panels disposed generally horizontally and interposed between the lower portions of each consecutive pair of bulkheads near the lower edges of the bulkheads.

5. The automobile chassis of claim 3, wherein each said panel comprises a multiplicity of contiguous, rigidly attached cells fabricated from the metal alloy and arrayed in a honeycomb pattern, each cell having an interior diametric dimension of about one-inch.

6. The automobile chassis of claim 5, wherein each panel further comprises a thermoplastic foam between and surrounding the honeycomb cells.

7. The automobile chassis of claim 6, wherein the thermoplastic is a single type selected from the group consisting of a polycarbonate, a polycarbonate/ABS blend, and a polyimide.

8. The automobile chassis of claim 7, wherein the thermoplastic is of an unreinforced grade.

9. The automobile chassis of claim 3, wherein each panel further comprises a liquid crystal polymer thermoplastic between and surrounding the honeycomb cells.

10. The automobile chassis of claim 9, wherein the liquid crystal polymer thermoplastic is of a grade reinforced with microballoons.

11. The automobile chassis of claim 1, wherein said means for preventing compressive deformation of the bulkheads and tubes due to a high-load impact on the chassis applied parallel to the horizontal axis comprises first and second thermoplastic blocks disposed generally vertically and interposed between, respectively, the first and second outer portions of consecutive pairs of bulkheads.

12. The automobile chassis of claim 1, wherein said means for preventing compressive deformation of the bulkheads and tubes due to a high-load impact on the chassis applied parallel to the horizontal axis comprises first and second pluralities of aggregated sub-assemblies of contiguous thermoplastic blocks disposed generally vertically and interposed between, respectively, the first and second outer portions of consecutive pairs of bulkheads, each block having generally commensurate height, width and depth.

13. The automobile chassis of claim 1, wherein said means for preventing compressive deformation of the bulkheads and tubes due to a high-load impact on the chassis applied transverse to the horizontal axis comprises opposed first and second thermoplastic blocks disposed generally horizontally and interposed between each consecutive pair of bulkheads near the lower edges of the bulkheads.

14. The automobile chassis of claim 1, wherein said means for preventing compressive deformation of the bulkheads and tubes due to a high-load impact on the chassis applied transverse to the horizontal axis comprises a plurality of aggregated sub-assemblies of contiguous thermoplastic blocks disposed generally horizontally and interposed between each consecutive pair of bulkheads near the lower edges of the bulkheads, each block having generally commensurate height, width and depth.

15. The automobile chassis of claim 11, wherein each said block is fabricated from a polycarbonate and comprises a multiplicity of cells arrayed in a honeycomb pattern, each cell having an outer diametric dimension of about ½-inch.

16. The automobile chassis of claim 15, wherein each block further comprises a polycarbonate thermoplastic foam between and surrounding the honeycomb cells.

17. The automobile chassis of claim 16, wherein the thermoplastic is a single type of polycarbonate.

18. The automobile chassis of claim 17, wherein the polycarbonate thermoplastic is of an unreinforced grade.

19. An integrated automobile chassis and body comprising:

a plurality of generally parallel planar bulkheads, each bulkhead fabricated from a single common type of metal alloy and perpendicular to and aligned generally transversely and symmetrically relative to a common generally horizontal longitudinal axis, and including a first outer portion terminating in a generally vertical first outer edge, a second outer portion terminating in a generally vertical second outer edge, a central portion disposed between the first and second outer portions, and a base portion terminating in a generally horizontal lower edge, the first outer portion including therethrough a first plurality of holes disposed generally vertically, the second outer portion including therethrough a second plurality of holes disposed generally vertically, the central portion including therethrough first and second central holes disposed vertically, the base portion including therethrough a third plurality of holes disposed generally horizontally, corresponding holes in successive bulkheads being aligned congruently along a common horizontal axis;

a plurality of tubes fabricated from the metal alloy, each tube closely received within and disposed through a plurality of successive congruently and horizontally aligned holes, the bulkheads and tubes comprising a chassis frame including an engine enclosure module;

first and second pluralities of contiguous structures disposed generally vertically and interposed between, respectively, the first and second outer portions of consecutive pairs of bulkheads;

a third plurality of contiguous structures disposed generally vertically and interposed between the central portions of consecutive pairs of bulkheads;

fourth and fifth pluralities of contiguous structures disposed generally horizontally and interposed between the base portions of consecutive pairs of bulkheads;

a unitary body rotomolded from a single type of thermoplastic, superposed upon and closely receiving and enclosing the chassis frame, the body comprising a plurality of interior panels and a cockpit exterior to the chassis frame, and an underbody disposed generally horizontally beneath the chassis frame; and a layer of the thermoplastic interposed between and bonding the body to the chassis frame.

20. The integrated automobile chassis and body of claim 19, wherein the metal alloy is an aluminum alloy.

21. The integrated automobile chassis and body of claim 20, wherein:

said contiguous structures are generally planar aluminum panels, each panel comprising a multiplicity of contiguous cells arrayed in a honeycomb pattern, each cell having generally common outer and interior diametric dimensions, and each panel further comprising said thermoplastic between and surrounding the honeycomb cells; and the thermoplastic pervades all spaces interior to the chassis frame not occupied by the bulkheads, tubes and panels.

22. The integrated automobile chassis and body of claim 21 wherein:

the thermoplastic is selected from the group consisting of a polycarbonate, a polycarbonate/ABS blend, and a polyimide;

the unitary body is rotomolded from a reinforced grade of the thermoplastic;

the bonding layer interposed between the body and chassis frame is a reinforced grade of the thermoplastic; and the thermoplastic pervading the honeycomb-cell panels and chassis interior is an unreinforced foam of the selected type.

23. The integrated automobile chassis and body of claim 21 wherein:

the thermoplastic is a liquid crystal polymer;

the unitary body is rotomolded from a reinforced grade of the liquid crystal polymer;

the bonding layer interposed between the body and chassis frame is the reinforced grade of the liquid crystal polymer; and the thermoplastic pervading the honeycomb-cell panels and chassis interior is the reinforced grade of the liquid crystal polymer.

24. The integrated automobile chassis and body of claim 19, wherein:

said contiguous structures are aggregated sub-assemblies of blocks fabricated from a polycarbonate thermoplastic, each block comprising a multiplicity of cells arrayed in a honeycomb pattern, each cell having generally common outer and interior diametric dimensions;

a foam of an unreinforced grade of the polycarbonate pervades the cells;

the unitary body is rotomolded from the unreinforced grade of the polycarbonate; and the thermoplastic pervades all spaces interior to the chassis frame not occupied by the bulkheads, tubes and honeycomb-cell structures.

25. An integrated automobile chassis and body comprising:

serially disposed first, second, third, fourth, fifth, sixth and seventh generally planar bulkheads fabricated from a single type of aluminum alloy, the bulkheads being mutually parallel and aligned generally transversely with and perpendicular to a common generally horizontal longitudinal axis;

the first, second and seventh bulkheads being identical one-piece cast moldings comprising opposed first and second outer portions each terminating in a generally horizontal upper edge and each including therethrough an upper, middle and lower tubing section hole, a central portion disposed between the outer portions and including therethrough a lower and an upper backbone tube hole and a first and second tubing section hole, the tubing section holes symmetrically disposed with respect to the lower backbone tube hole, and first and second shock tower assembly portions generally orthogonal to the upper edges of the outer portions;

the third bulkhead comprising a cast-molded W-shaped section and a generally horizontal cross-piece section, the W-shaped section including opposed first and second arcuately-shaped outer portions each including therethrough an upper, middle and lower tubing section hole, a trapezoidal-shaped central portion including therethrough a lower and an upper backbone tube hole and a first and second tubing section hole, the tubing section holes symmetrically disposed with respect to the lower backbone tube hole, and a generally horizontal base portion including therethrough two pairs of tubing section holes disposed symmetrically with respect to the central portion, the W-shaped and cross-piece sections being rigidly joined by adhesives and a plurality of pop-rivets;

the fourth bulkhead comprising a central portion identical to the W-shaped Section of the third bulkhead, and opposed first and second angle-shaped frame support members, each member including a base segment and a bracket segment both orthogonal to the central portion, and a brace segment disposed diagonally between the brace and bracket segments;

the fifth bulkhead comprising a W-shaped section and a horizontal cross-piece section identical to the third bulkhead sections, and first and second X-shaped ribbing sections disposed between, respectively, the central portion and first and second outer portions of the W-shaped section, the W-shaped section, cross-piece and first and second ribbing sections rigidly joined by adhesives and a plurality of pop-rivets;

the sixth bulkhead comprising a U-shaped section including opposed first and second outer portions each including therethrough an upper, middle and lower tubing section hole, a base portion including a first and second tubing section hole, and a generally horizontal cross-piece section including opposed first and second shock tower assembly portions, the U-shaped and cross-piece sections rigidly joined by adhesives and a plurality of pop-rivets;

opposed arcuately-shaped first and second upper thinwall tubing sections and opposed arcuately-shaped first and second middle thinwall tubing sections fabricated from the aluminum alloy, each tubing section closely received within and disposed through, respectively, the upper tubing section hole of the first and second outer portions of the first, second and third bulkheads, and the middle tubing section hole of the first and second outer portions of the first, second and third bulkheads;

opposed arcuately-shaped third and fourth upper thinwall tubing sections and opposed arcuately-shaped third and fourth middle thinwall tubing sections fabricated from the aluminum alloy, each tubing section closely received within and disposed through, respectively, the upper tubing section hole of the first and second portions of the fifth, sixth and seventh bulkheads, and the middle tubing section hole of the first and second outer portions of the fifth, sixth and seventh bulkheads;

opposed arcuately-shaped first and second lower thinwall tubing sections fabricated from the aluminum alloy, each tubing section closely received within and disposed through, respectively, the lower tubing section hole of the first and second outer portions of the first, second, third, fourth, fifth, sixth and seventh bulkheads;

opposed pairs of relatively short, straight thinwall tubing sections fabricated from the aluminum alloy, each tubing section closely received within and disposed through, respectively, one of said tubing section holes disposed symmetrically with respect to the central portion in the third, fourth and fifth bulkheads;

opposed third and fourth relatively long, arcuately-shaped thinwall tubing sections fabricated from the aluminum alloy, each tubing section disposed between a pair of said short, straight tubing sections and closely received within and disposed through one of said tubing section holes in the first, second, third, fourth, fifth, sixth and seventh bulkheads;

first and second backbone tubes fabricated from the aluminum alloy, the tubes closely received within and disposed through, respectively, the lower and upper backbone tube holes in the first, second, third, fourth, fifth and seventh bulkheads;

a unitary body rotomolded from a single type of thermoplastic, superposed upon and closely receiving and enclosing the seven bulkheads, thinwall tubing sections and backbone tubes, the body comprising a plurality of interior panels and a cockpit exterior to the chassis frame, and an underbody disposed generally horizontally beneath the chassis frame; and a layer of the thermoplastic interposed between and bonding the body to the bulkheads, thinwall tubing sections and backbone tubes.

26. The integrated automobile chassis and body of claim 25, further comprising:

first, second and third stacks of generally planar panels fabricated from the aluminum alloy, each panel comprising a multiplicity of contiguous, rigidly attached cells arrayed in a honeycomb pattern, each cell having generally common outer and interior diametric dimensions, the panels comprising the first and second stacks rectangular-shaped, each panel including therethrough three generally collinear tubing section holes, the panels comprising the third stack being trapezoidal-shaped, each panel including therethrough a lower and an upper backbone tube hole and opposed first and second tubing section holes adjacent to the lower backbone hole, the first and second panel stacks disposed generally vertically and interposed and closely received, respectively, between the first and second outer portions of the first and second bulkheads, the third panel stack disposed generally vertically and interposed and closely received between the central portions of the first and second bulkheads;

the first and second upper tubing sections, first and second middle tubing sections, and first and second lower tubing sections being disposed, respectively, therethrough the first and second upper, middle and lower tubing section holes of the first bulkhead, the three collinear holes in the panels of the first and second stacks, and the first and second upper, middle and lower tubing section holes of the second bulkhead;

the first and second backbone tubes, and third and fourth long, arcuately-shaped tubing sections being disposed, respectively, therethrough the lower and upper backbone tube holes and neighboring first and second tubing section holes of the first bulkhead, third stack, and second bulkhead;

fourth, fifth and sixth stacks of generally planar panels fabricated from the aluminum alloy, each panel comprising a multiplicity of said honeycomb cells, the panels comprising the fourth and fifth stacks rectangular-shaped, each panel including therethrough three generally collinear tubing section holes, the panels comprising the sixth stack trapezoidal-shaped, each panel including therethrough a lower and an upper backbone tube hole and opposed first and second tubing section holes adjacent to the lower backbone hole, the fourth and fifth panel stacks disposed generally vertically and interposed and closely received, respectively, between the first and second outer portions of the second and third bulkheads, the sixth panel stack disposed generally vertically and interposed and closely received between the central portions of the second and third bulkheads;

the first and second upper tubing sections, first and second middle tubing sections, and first and second lower tubing sections being disposed, respectively, therethrough the three collinear holes in the panels of the fourth and fifth stacks, and the first and second upper, middle and lower tubing section holes of the third bulkhead;

the first and second backbone tubes, and third and fourth long, arcuately-shaped tubing sections being disposed, respectively, therethrough the lower and upper backbone tube holes and neighboring first and second tubing section holes of the sixth stack and third bulkhead;

seventh, eighth and ninth stacks of generally planar panels fabricated from the aluminum alloy, each panel comprising a multiplicity of said honeycomb cells, the panels comprising the seventh and eighth stacks rectangular-shaped, each panel including therethrough two generally collinear tubing section holes, the panels comprising the ninth stack trapezoidal-shaped, each panel including therethrough a lower and an upper backbone tube hole and opposed first and second tubing section holes adjacent to the lower backbone hole, the seventh and eighth panel stacks disposed generally horizontally and interposed and closely received, respectively, between the base portions of the third and fourth bulkheads, the ninth panel stack disposed generally vertically and interposed and closely received between the central portions of the third and fourth bulkheads;

opposed pairs of the relatively short, straight tubing sections being disposed, respectively, therethrough the two pairs of tubing section holes in the base portion of the third bulkhead, the two collinear holes in the panels of the seventh and eighth stacks, and the two pairs of tubing section holes in the base portion of the fourth bulkhead;

the first and second backbone tubes, and third and fourth long, arcuately-shaped tubing sections being disposed, respectively, therethrough the lower and upper backbone tube holes and neighboring first and second tubing section holes of the ninth stack and fourth bulkhead;

tenth, eleventh, twelfth, thirteenth and fourteenth stacks of generally planar panels fabricated from the aluminum alloy, each panel comprising a multiplicity of said honeycomb cells, the panels comprising the tenth and eleventh stacks rectangular-shaped, each panel including therethrough three generally collinear tubing section holes, the panels comprising the twelfth stack trapezoidal-shaped, each panel including therethrough a lower and an upper backbone tube hole and opposed first and second tubing section holes adjacent to the lower backbone hole, the panels comprising the thirteenth and fourteenth stacks rectangular-shaped, each panel including therethrough two tubing section holes, the tenth and eleventh stacks disposed generally vertically and interposed and closely received, respectively, between the outer portions of the fourth and fifth bulkheads, the twelfth panel stack disposed generally vertically and interposed and closely received between the central portions of the fourth and fifth bulkheads, the thirteenth and fourteenth stacks disposed generally horizontally and interposed and received between the base portions of the fourth and fifth bulkheads;

opposed pairs of the relatively short, straight tubing sections being disposed, respectively, therethrough the two tubing section holes in the panels of the thirteenth and fourteenth stacks, and the two pairs of tubing section holes in the base portion of the fifth bulkhead;

the first and second backbone tubes, and third and fourth long, arcuately-shaped tubing sections being disposed, respectively, therethrough the lower and upper backbone tube holes and neighboring first and second tubing section holes of the twelfth stack and fifth bulkhead;

fifteenth, sixteenth, seventeenth and eighteenth stacks of generally planar panels fabricated from the aluminum alloy, each panel comprising a multiplicity of said honeycomb cells, the panels comprising the fifteenth and sixteenth stacks rectangular-shaped, each panel including therethrough three generally collinear tubing section holes, the panels comprising the seventeenth and eighteenth stacks rectangular-shaped, each panel including therethrough one tubing section hole, the fifteenth and sixteenth stacks disposed generally vertically and interposed and closely received, respectively, between the outer portions of the fifth and sixth bulkheads, the seventeenth and eighteenth stacks disposed generally horizontally and interposed and received between the base portions of the fifth and sixth bulkheads;

the third and fourth upper tubing sections, third and fourth middle tubing sections, and first and second lower tubing sections being disposed, respectively, therethrough the first and second upper, middle and lower tubing section holes of the fifth bulkhead, the three collinear holes in the panels of the fifteenth and sixteenth stacks, and the first and second upper, middle and lower tubing section holes of the sixth bulkhead;

the first and second long, straight tubing sections being disposed, respectively, therethrough the single tubing section holes of the seventeenth and eighteenth stacks and said neighboring first and second tubing section holes of the sixth bulkhead;

nineteenth, twentieth, twenty-first and twenty-second stacks of generally planar panels fabricated from the aluminum alloy, each panel comprising a multiplicity of said honeycomb cells, the panels comprising the nineteenth and twentieth stacks rectangular-shaped, each panel including therethrough three generally collinear tubing section holes, the panels comprising the twenty-first and twenty-second stacks rectangular-shaped, each panel including therethrough one tubing section hole, the nineteenth and twentieth stacks disposed generally vertically and interposed and closely received, respectively, between the outer portions of the sixth and seventh bulkheads, the twenty-first and twenty-second stacks disposed generally horizontally and interposed and received between the base portions of the sixth and seventh bulkheads;

the third and fourth upper tubing sections, third and fourth middle tubing sections, and first and second lower tubing sections being disposed, respectively, therethrough the three collinear holes in the panels of the nineteenth and twentieth stacks, and the first and second upper, middle and lower tubing section holes of the seventh bulkhead;

the first and second long, straight tubing sections being disposed, respectively, therethrough the single tubing section holes of the twenty-first and twenty-second stacks and said neighboring first and second tubing section holes of the seventh bulkhead.

27. The integrated automobile chassis and body of claim 26, wherein:

the interior diametric dimension of the honeycomb cells is about one-inch;

the thermoplastic is selected from the group consisting of a polycarbonate, a polycarbonate/ABS blend, and a polyimide;

cavities and interstices between and among the bulkheads, panel stacks, thinwall tubes and backbone tubes are pervaded with a reinforced grade of the thermoplastic; and the honeycomb panels are impregnated with a foam of an unreinforced grade of the thermoplastic.

28. The integrated automobile chassis and body of claim 26, wherein:

the interior diametric dimension of the honeycomb cells is about one-inch;

the thermoplastic is a liquid crystal polymer;

the honeycomb panels are impregnated with a reinforced grade of the liquid crystal polymer; and cavities and interstices between and among the bulkheads, panel stacks, thinwall tubes and backbone tubes are pervaded with the reinforced liquid crystal polymer.

29. The integrated automobile chassis and body of claim 25, further comprising:

first, second and third contiguous sub-assemblies of blocks fabricated from the thermoplastic, each block comprising a multiplicity of contiguous, rigidly attached cells arrayed in a honeycomb pattern, each cell having generally common outer and interior diametric dimensions, the first and second sub-assemblies rectangular-shaped, each sub-assembly including therethrough three generally collinear tubing section holes, the third sub-assembly being trapezoidal-shaped and including therethrough a lower and an upper backbone tube hole and opposed first and second tubing section holes adjacent to the lower backbone hole, the first and second sub-assemblies disposed generally vertically and interposed and closely received, respectively, between the first and second outer portions of the first and second bulkheads, the third sub-assembly disposed generally vertically and interposed and closely received between the central portions of the first and second bulkheads;

the first and second upper tubing sections, first and second middle tubing sections, and first and second lower tubing sections being disposed, respectively, therethrough the first and second upper, middle and lower tubing section holes of the first bulkhead, the three collinear holes in the first and second sub-assemblies, and the first and second upper, middle and lower tubing section holes of the second bulkhead;

the first and second backbone tubes, and third and fourth long, arcuately-shaped tubing sections being disposed, respectively, therethrough the lower and upper backbone tube holes and neighboring first and second tubing section holes of the first bulkhead, third sub-assembly, and second bulkhead;

fourth, fifth and sixth sub-assemblies of contiguous blocks fabricated from the thermoplastic, each block comprising a multiplicity of said honeycomb cells, the fourth and fifth sub-assemblies rectangular-shaped, each sub-assembly including therethrough three generally collinear tubing section holes, the sixth sub-assembly trapezoidal-shaped and including therethrough a lower and an upper backbone tube hole and opposed first and second tubing section holes adjacent to the lower backbone hole, the fourth and fifth sub-assemblies disposed generally vertically and interposed and closely received, respectively, between the first and second outer portions of the second and third bulkheads, the sixth sub-assembly disposed generally vertically and interposed and closely received between the central portions of the second and third bulkheads;

the first and second upper tubing sections, first and second middle tubing sections, and first and second lower tubing sections being disposed, respectively, therethrough the three collinear holes in the fourth and fifth sub-assemblies, and the first and second upper, middle and lower tubing section holes of the third bulkhead;

the first and second backbone tubes, and third and fourth long, arcuately-shaped tubing sections being disposed, respectively, therethrough the lower and upper backbone tube holes and neighboring first and second tubing section holes of the sixth sub-assembly and third bulkhead;

seventh, eighth and ninth sub-assemblies of contiguous blocks fabricated from the thermoplastic, each block comprising a multiplicity of said honeycomb cells, the seventh and eighth sub-assemblies rectangular-shaped, each sub-assembly including therethrough two generally collinear tubing section holes, the ninth sub-assembly trapezoidal-shaped and including therethrough a lower and an upper backbone tube hole and opposed first and second tubing section holes adjacent to the lower backbone hole, the seventh and eighth sub-assemblies disposed generally horizontally and interposed and closely received, respectively, between the base portions of the third and fourth bulkheads, the ninth sub-assembly disposed generally vertically and interposed and closely received between the central portions of the third and fourth bulkheads;

opposed pairs of the relatively short, straight tubing sections being disposed, respectively, therethrough the two pairs of tubing section holes in the base portion of the third bulkhead, the two collinear holes in the seventh and eighth sub-assemblies, and the two pairs of tubing section holes in the base portion of the fourth bulkhead;

the first and second backbone tubes, and third and fourth long, arcuately-shaped tubing sections being disposed, respectively, therethrough the lower and upper backbone tube holes and neighboring first and second tubing section holes of the ninth sub-assembly and fourth bulkhead;

tenth, eleventh, twelfth, thirteenth and fourteenth sub-assemblies of contiguous blocks fabricated from the thermoplastic, each block comprising a multiplicity of said honeycomb cells, the tenth and eleventh sub-assemblies rectangular-shaped, each sub-assembly including therethrough three generally collinear tubing section holes, the twelfth sub-assembly trapezoidal-shaped and including therethrough a lower and an upper backbone tube hole and opposed first and second tubing section holes adjacent to the lower backbone hole, the thirteenth and fourteenth sub-assemblies rectangular-shaped, each sub-assembly including therethrough two tubing section holes, the tenth and eleventh sub-assemblies disposed generally vertically and interposed and closely received, respectively, between the outer portions of the fourth and fifth bulkheads, the twelfth sub-assembly disposed generally vertically and interposed and closely received between the central portions of the fourth and fifth bulkheads, the thirteenth and fourteenth sub-assemblies disposed generally horizontally and interposed and received between the base portions of the fourth and fifth bulkheads;

opposed pairs of the relatively short, straight tubing sections being disposed, respectively, therethrough the two tubing section holes in the thirteenth and fourteenth sub-assemblies, and the two pairs of tubing section holes in the base portion of the fifth bulkhead;

the first and second backbone tubes, and third and fourth long, arcuately-shaped tubing sections being disposed, respectively, therethrough the lower and upper backbone tube holes and neighboring first and second tubing section holes of the twelfth sub-assembly and fifth bulkhead;

fifteenth, sixteenth, seventeenth and eighteenth sub-assemblies of contiguous blocks fabricated from the thermoplastic, each block comprising a multiplicity of said honeycomb cells, the fifteenth and sixteenth sub-assemblies rectangular-shaped, each sub-assembly including therethrough three generally collinear tubing section holes, the seventeenth and eighteenth sub-assemblies rectangular-shaped, each sub-assembly including therethrough one tubing section hole, the fifteenth and sixteenth sub-assemblies disposed generally vertically and interposed and closely received, respectively, between the outer portions of the fifth and sixth bulkheads, the seventeenth and eighteenth sub-assemblies disposed generally horizontally and interposed and received between the base portions of the fifth and sixth bulkheads;

the third and fourth upper tubing sections, third and fourth middle tubing sections, and first and second lower tubing sections being disposed, respectively, therethrough the first and second upper, middle and lower tubing section holes of the fifth bulkhead, the three collinear holes in the fifteenth and sixteenth sub-assemblies, and the first and second upper, middle and lower tubing section holes of the sixth bulkhead;

the first and second long, straight tubing sections being disposed, respectively, therethrough the single tubing section holes of the seventeenth and eighteenth sub-assemblies and said neighboring first and second tubing section holes of the sixth bulkhead;

nineteenth, twentieth, twenty-first and twenty-second sub-assemblies of contiguous blocks fabricated from the thermoplastic, each block comprising a multiplicity of said honeycomb cells, the nineteenth and twentieth sub-assemblies rectangular-shaped, each sub-assembly including therethrough three generally collinear tubing section holes, the twenty-first and twenty-second sub-assemblies rectangular-shaped, each sub-assembly including therethrough one tubing section hole, the nineteenth and twentieth sub-assemblies disposed generally vertically and interposed and closely received, respectively, between the outer portions of the sixth and seventh bulkheads, the twenty-first and twenty-second sub-assemblies disposed generally horizontally and interposed and received between the base portions of the sixth and seventh bulkheads;

the third and fourth upper tubing sections, third and fourth middle tubing sections, and first and second lower tubing sections being disposed, respectively, therethrough the three collinear holes in the nineteenth and twentieth sub-assemblies, and the first and second upper, middle and lower tubing section holes of the seventh bulkhead;

the first and second long, straight tubing sections being disposed, respectively, therethrough the single tubing section holes of the twenty-first and twenty-second sub-assemblies and said neighboring first and second tubing section holes of the seventh bulkhead.

30. The integrated automobile chassis and body of claim 29, wherein:

the outer diametric dimension of the honeycomb cells is about ½-inch;

the thermoplastic is a polycarbonate;

the polycarbonate thermoplastic blocks are impregnated with a foam of a unreinforced grade of the polycarbonate; and cavities and interstices between and among the bulkheads, panel stacks, thinwall tubes and backbone tubes are pervaded with an unreinforced grade of the polycarbonate.

31. A method of assembling a recyclable automobile chassis highly resistant to high-load impacts, which comprises:

fabricating a plurality of generally planar bulkheads from a single common type of metal alloy, each bulkhead including a lower portion terminating in a generally horizontal lower edge, a first outer portion having a first plurality of vertically spaced holes therethrough, the first outer portion terminating in a first vertical outer edge, a second outer portion having a second plurality of vertically spaced holes therethrough, the second outer portion terminating in a second and opposite vertical outer edge, and a middle portion having first and second vertically spaced central holes therethrough, the middle portion disposed between the first and second outer portions;

disposing the bulkheads in a generally and mutually parallel orientation, each bulkhead perpendicular to and aligned generally transversely and symmetrically relative to a common horizontal longitudinal axis, corresponding successive ones of said holes being aligned congruently and horizontally;

rigidly maintaining a preselected separation between each successive pair of bulkheads by passing a plurality of tubes fabricated from the metal alloy through respective successive congruent and horizontally aligned holes, and fixing said bulkhead portions to said plurality of tubes; and interposing and rigidly attaching pluralities of contiguous structures between the first outer portions, second outer portions, middle portions, and lower portions of successive pairs of bulkheads, the contiguous structures between said bulkhead portions preventing compression deformation of the bulkheads and tubes due to high-load impacts on the chassis applied parallel to the horizontal axis and transverse to the horizontal axis.

32. The method of claim 31, wherein each of said contiguous structures comprises a multiplicity of contiguous closed cells fabricated from the metal alloy and arrayed in a honeycomb pattern, each cell having a generally common interior diametric dimension, and wherein said method further comprises:

heating the honeycomb-cell structures to a common predetermined temperature sufficient to liquefy a thermoplastic of a single preselected type; and permeating the honeycomb-cell structures with the liquefied thermoplastic.

33. The method of claim 31, wherein the metal alloy is an aluminum alloy.

34. The method of claim 32, wherein each honeycomb-cell structure is a generally planar panel.

35. The method of claim 32, wherein the thermoplastic is selected from the group consisting of a polycarbonate, a polycarbonate/ABS blend, a polyimide, and a reinforced liquid crystal polymer.

36. The method of claim 31, further comprising:

interposing and rigidly attaching first, second, third, and fourth structures between, respectively, the first outer portions, second outer portions, middle portions, and portions of successive pairs of bulkheads, each structure fabricated from the thermoplastic and comprising a multiplicity of cells arrayed in a honeycomb pattern, each cell having a generally common interior diametric dimension; and permeating the cells with a foam of the thermoplastic.

37. The method of claim 31, further comprising:

interposing and rigidly attaching pluralities of aggregated sub-assemblies of contiguous blocks between the first outer portions, second outer portions, middle portions, and lower portions of successive pairs of bulkheads, each block fabricated from the thermoplastic and comprising a multiplicity of cells arrayed in a honeycomb pattern, each cell having generally common outer and interior diametric dimensions, the blocks having generally commensurate height, width, and depth; and permeating the cells with a foam of the thermoplastic.

* * * * *